United States Patent
Suryavanshi et al.

(10) Patent No.: US 9,642,041 B2
(45) Date of Patent: May 2, 2017

(54) PEER-ASSISTED SEAMLESS MOBILITY FOR PEER-TO-PEER DATA TRAFFIC

(71) Applicant: QUALCOMM Incorporated, San Diego, CA (US)

(72) Inventors: Vijay Anandrao Suryavanshi, San Diego, CA (US); Kirankumar Bhoja Anchan, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 14/549,018

(22) Filed: Nov. 20, 2014

(65) Prior Publication Data

US 2016/0150443 A1    May 26, 2016

(51) Int. Cl.
| | |
|---|---|
| H04L 12/66 | (2006.01) |
| H04W 36/00 | (2009.01) |
| H04L 29/08 | (2006.01) |
| H04W 76/04 | (2009.01) |
| H04W 88/02 | (2009.01) |
| H04W 88/18 | (2009.01) |
| H04W 36/14 | (2009.01) |

(52) U.S. Cl.
CPC ..... *H04W 36/0011* (2013.01); *H04L 67/1042* (2013.01); *H04W 36/00* (2013.01); *H04W 76/043* (2013.01); *H04W 36/14* (2013.01); *H04W 88/02* (2013.01); *H04W 88/182* (2013.01)

(58) Field of Classification Search
CPC ............. H04W 36/0011; H04W 36/00; H04W 76/043; H04W 36/14; H04W 88/02; H04W 88/182; H04L 67/1042
See application file for complete search history.

(56) References Cited

U.S. PATENT DOCUMENTS

| | | | |
|---|---|---|---|
| 8,666,419 | B1 | 3/2014 | Faccin et al. |
| 8,707,391 | B2 | 4/2014 | Song et al. |
| 2011/0294474 | A1 | 12/2011 | Barany et al. |
| 2013/0051362 | A1* | 2/2013 | Lee ........................ H04W 36/30 370/331 |
| 2014/0092885 | A1 | 4/2014 | Venkatachalam et al. |

(Continued)

FOREIGN PATENT DOCUMENTS

| | | |
|---|---|---|
| EP | 2739087 A1 | 6/2014 |
| EP | 2770798 A1 | 8/2014 |

OTHER PUBLICATIONS

Kim F, et al., "Supporting Seamless Mobility for P2P Live Streaming," The Scientific World Journal, 2014, vol. 2014, pp. 2-8.

(Continued)

*Primary Examiner* — Clemence Han
(74) *Attorney, Agent, or Firm* — Muncy, Geissler, Olds & Lowe, P.C.

(57) ABSTRACT

Systems and methods are disclosed for maintaining continuity of a peer-to-peer group session. The method may include exchanging a first P2P group session communication with a member of the P2P group via a direct data traffic connection, requesting session data from an application server, conveying the session data to a proxy UE, wherein the proxy UE is a member of the P2P group, and exchanging a second P2P group session communication with the application server in accordance with the session data.

30 Claims, 14 Drawing Sheets

(56) References Cited

U.S. PATENT DOCUMENTS

| | | |
|---|---|---|
| 2014/0098734 A1 | 4/2014 | Kalhan et al. |
| 2014/0181201 A1* | 6/2014 | Choi .................... H04W 8/186 709/204 |
| 2014/0235234 A1* | 8/2014 | Jang ..................... H04W 36/18 455/426.1 |

OTHER PUBLICATIONS

International Search Report and Written Opinion—PCT/US2015/057394—ISA/EPO—Jan. 26, 2016.

* cited by examiner

PEER-ASSISTED SEAMLESS MOBILITY FOR PEER-TO-PEER DATA TRAFFIC

BACKGROUND OF THE INVENTION

Aspects of this disclosure relate to wireless communications systems. In particular, aspects of this disclosure relate to continuity maintenance of a peer-to-peer group session when a member of the peer-to-peer group exits a coverage area.

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

In recent years, usage of direct peer-to-peer (P2P) communications has increased. LTE Direct (LTE-D) is a proposed 3GPP (Release 12) device-to-device (D2D) solution for proximate discovery. LTE-D dispenses with location tracking and network calls by directly monitoring for services on other LTE-D devices within a large range (~500 m, line of sight). It does so continuously in a synchronous system that is battery efficient, and can concurrently detect thousands of services in proximity.

LTE-D operates on licensed spectrum as a service to mobile applications. LTE-D enables service layer discovery. Mobile applications on LTE-D devices can instruct LTE-D to set a monitor for mobile application services on other devices. Moreover, mobile applications on LTE-D devices can announce their own services for detection by other LTE-D devices at the physical layer. The applications can be closed while LTE-D works continuously, and notifies the client application when it detects a match to the set monitor.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

The LTE wireless communications protocol enables LTE-D devices to discover one another, join an LTE-D group, and establish D2D direct data traffic connections among the members of the LTE-D group by configuring LTE-D parameters. For example, the LTE network may configure an interval at which LTE-D devices announce themselves, allocate channel resources for LTE-D sessions, etc. As a result, a problem arises when an LTE-D device performing LTE-D group communications leaves the radio access area of the LTE network. Solutions are needed for seamless continuation of communications among members of an LTE-D group when one of the members exits the radio access area of the LTE network.

SUMMARY

In one aspect, the present disclosure provides a method for a UE in a P2P group to maintain continuity of a P2P group session. The method may comprise, for example, exchanging a first P2P group session communication with a member of the P2P group via a direct data traffic connection, requesting session data from an application server, conveying the session data to a proxy UE, wherein the proxy UE is a member of the P2P group, and exchanging a second P2P group session communication with the application server in accordance with the session data.

In another aspect, the present disclosure provides a computer-readable medium comprising code, which, when executed by a processor, causes the processor to perform operations for maintaining continuity of a P2P group session. The computer-readable medium may comprise, for example, code for exchanging a first P2P group session communication with a member of the P2P group via a direct data traffic connection, code for requesting session data from an application server, code for conveying the session data to a proxy UE, wherein the proxy UE is a member of the P2P group, and code for exchanging a second P2P group session communication with the application server in accordance with the session data.

In another aspect, the present disclosure provides another apparatus for maintaining continuity of a P2P group session. The apparatus may comprise, for example, means for exchanging a first P2P group session communication with a member of the P2P group via a direct data traffic connection, means for requesting session data from an application server, means for conveying the session data to a proxy UE, wherein the proxy UE is a member of the P2P group, and means for exchanging a second P2P group session communication with the application server in accordance with the session data.

In another aspect, the present disclosure provides an apparatus for maintaining continuity of a P2P group session. The apparatus may comprise a memory and a processor. The processor may, for example, exchange a first P2P group session communication with a member of the P2P group via a direct data traffic connection, request session data from an application server, convey the session data to a proxy UE, wherein the proxy UE is a member of the P2P group, and exchange a second P2P group session communication with the application server in accordance with the session data.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
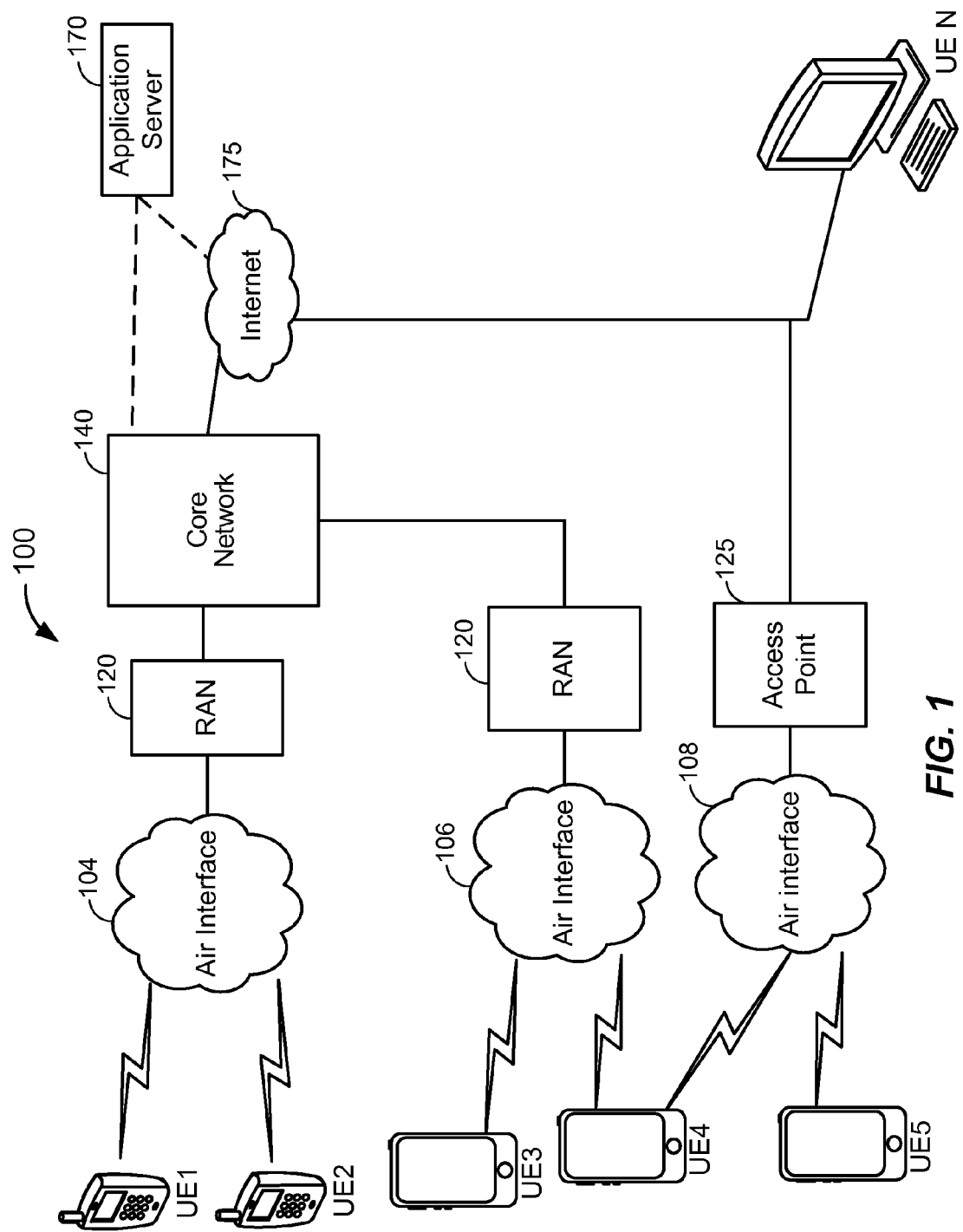
FIG. 1 illustrates a high-level system architecture of a wireless communications system in accordance with an aspect of the disclosure.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention. The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation. Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

An example of a protocol-specific implementations for the RAN 120 and the core network 140 is provided below in FIG. 2 to help explain the wireless communications system 100 in more detail. In particular, the components of the RAN 120 and the core network 140 correspond to components associated with supporting packet-switched (PS) communications. Legacy circuit-switched (CS) components may also be present in these networks, but any legacy CS-specific components are not shown explicitly in FIG. 2.

Figure 2:
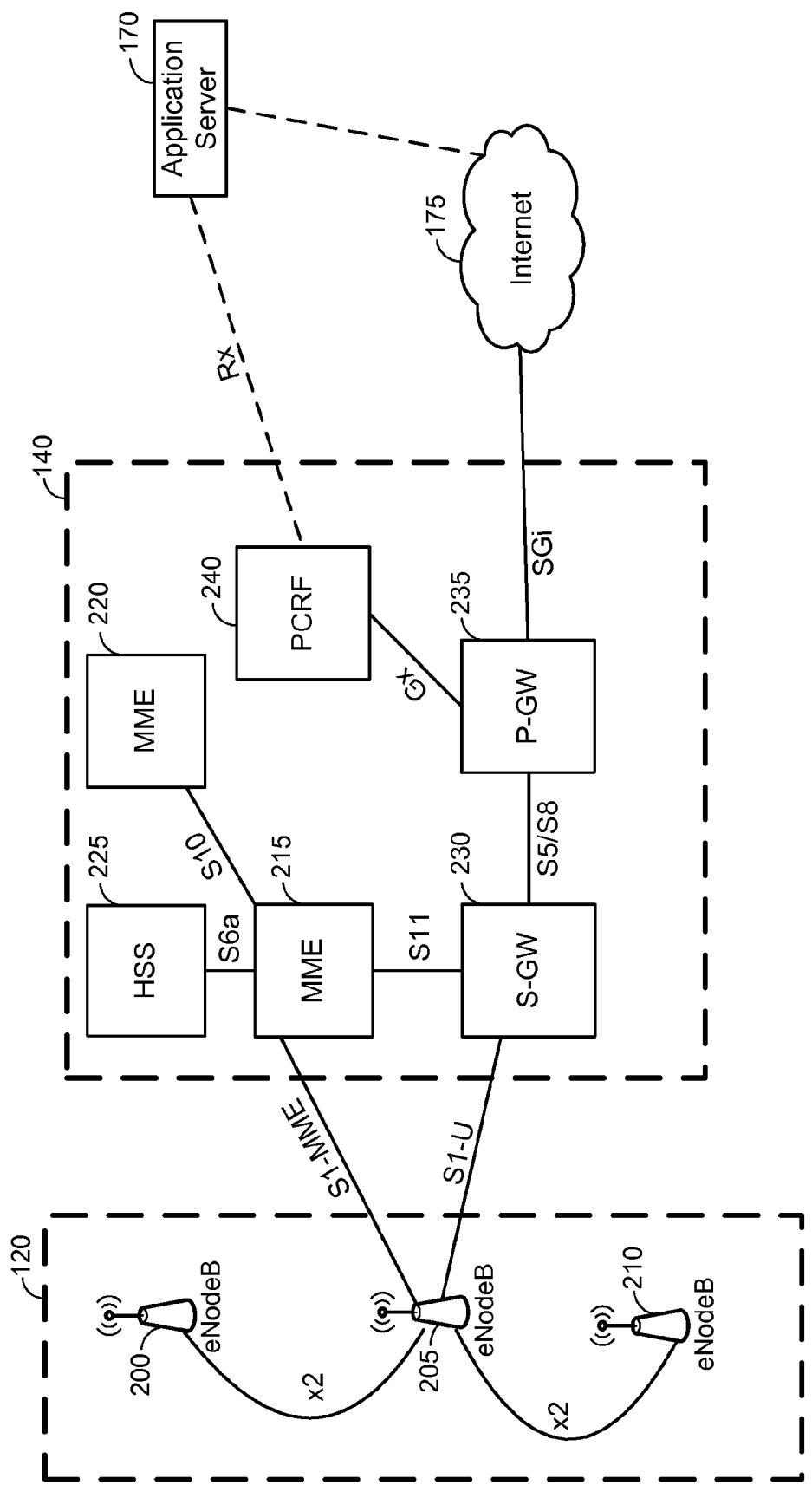
FIG. 2 illustrates an example configuration of the RAN and a packet-switched portion of the core network that is based on an Evolved Packet System (EPS) or Long Term Evolution (LTE) network in accordance with an aspect of the disclosure.

FIG. 2 illustrates an example configuration of the RAN 120 and a packet-switched portion of the core network 140 based on an Evolved Packet System (EPS) or LTE network, in accordance with an embodiment of the invention. The RAN 120 in the EPS/LTE network is configured with a plurality of Evolved Node Bs (ENodeBs or eNBs) 200, 205 and 210. ENodeBs in EPS/LTE networks generally do not require a separate controller within the RAN 120 to communicate with the core network 140.

In FIG. 2, the core network 140 includes a plurality of Mobility Management Entities (MMEs) 215 and 220, a Home Subscriber Server (HSS) 225, a Serving Gateway (S-GW) 230, a Packet Data Network Gateway (P-GW) 235 and a Policy and Charging Rules Function (PCRF) 240. Network interfaces between these components, the RAN 120 and the Internet 175 are illustrated in FIG. 2 and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215. |
| S1-U | Reference point between RAN 120 and S-GW 230 for the per bearer user plane tunneling and inter-eNodeB path switching during handover. |
| S5 | Provides user plane tunneling and tunnel management between S-GW 230 and P-GW 235. It is used for S-GW relocation due to UE mobility and if the S-GW 230 needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215 and HSS 225. |
| Gx | Provides transfer of Quality of Service (QoS) policy and charging rules from PCRF 240 to Policy a Charging Enforcement Function (PCEF) component (not shown) in the P-GW 235. |
| S8 | Inter-PLMN reference point providing user and control plane between the S-GW 230 in a Visited Public Land Mobile Network (VPLMN) and the P-GW 235 in a Home Public Land Mobile Network (HPLMN). S8 is the inter-PLMN variant of S5. |
| S10 | Reference point between MMEs 215 and 220 for MME relocation and MME to MME information transfer. |
| S11 | Reference point between MME 215 and S-GW 230. |
| SGi | Reference point between the P-GW 235 and the packet data network, shown in FIG. 2 as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240 and an application function (AF) that is used to exchanged application-level session information, where the AF is represented in FIG. 1 by the application server 170. |

A high-level description of the components shown in the RAN 120 and core network 140 of FIG. 2 will now be described. However, these components are each well-known in the art from various 3GPP TS standards, and the description contained herein is not intended to be an exhaustive description of all functionalities performed by these components.

Referring to FIG. 2, the MMEs 215 and 220 are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2, the S-GW 230 is the gateway that terminates the interface toward the RAN 120. For each UE associated with the core network 140 for an EPS-based system, at a given point of time, there is a single S-GW. The functions of the S-GW 230, for both the GTP-based and the Proxy Mobile IPv6 (PMIP)-based S5/S8, include: Mobility anchor point, Packet routing and forwarding, and setting the DiffSery Code Point (DSCP) based on a QoS Class Identifier (QCI) of the associated EPS bearer.

Referring to FIG. 2, the P-GW 235 is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235 provides PDN connectivity to both GSM/EDGE Radio Access Network (GERAN)/UTRAN only UEs and E-UTRAN-capable UEs using any of E-UTRAN, GERAN, or UTRAN. The P-GW 235 provides PDN connectivity to E-UTRAN capable UEs using E-UTRAN only over the S5/S8 interface.

Referring to FIG. 2, the PCRF 240 is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2, the application server 170 (e.g., which can be referred to as the AF in 3GPP terminology) is shown as connected to the core network 140 via the Internet 175, or alternatively to the PCRF 240 directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240. Any other application server offering IP data services over cellular network can also be connected to the PCRF 240 via the Rx reference point.

Figure 3:
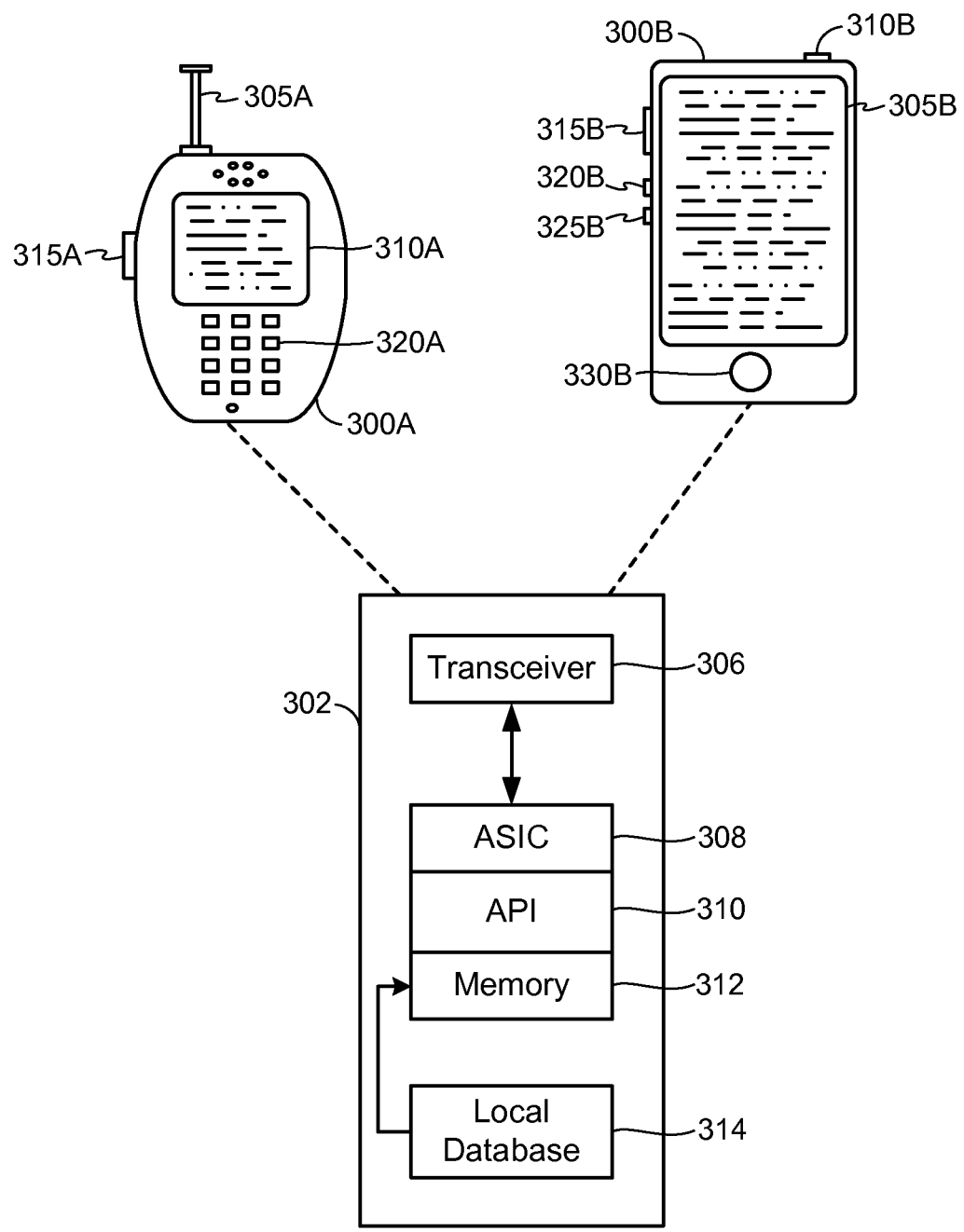
FIG. 3 illustrates examples of user equipments (UEs) in accordance with aspects of the disclosure.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
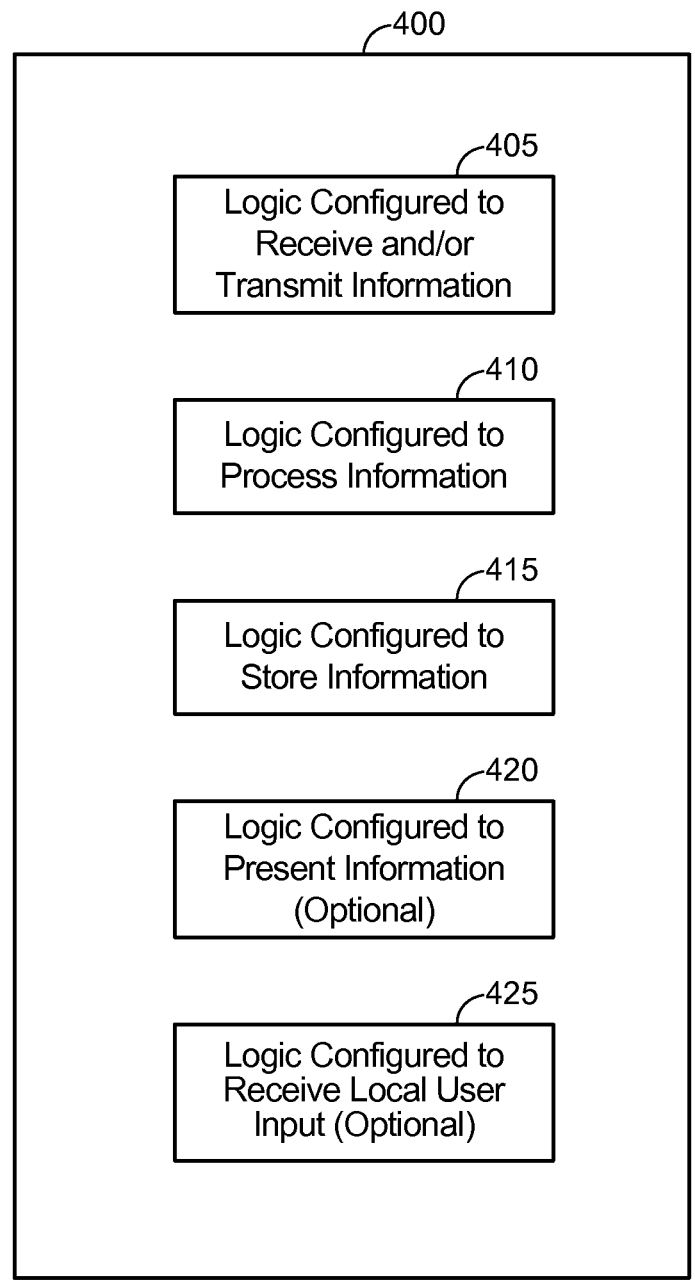
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., eNodeBs 200 through 210, etc.), any component of the core network 140 (e.g., MME 215 or 220, HSS 225, S-GW 230, P-GW 235, PCRF 240), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of eNodeBs 200 through 210, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
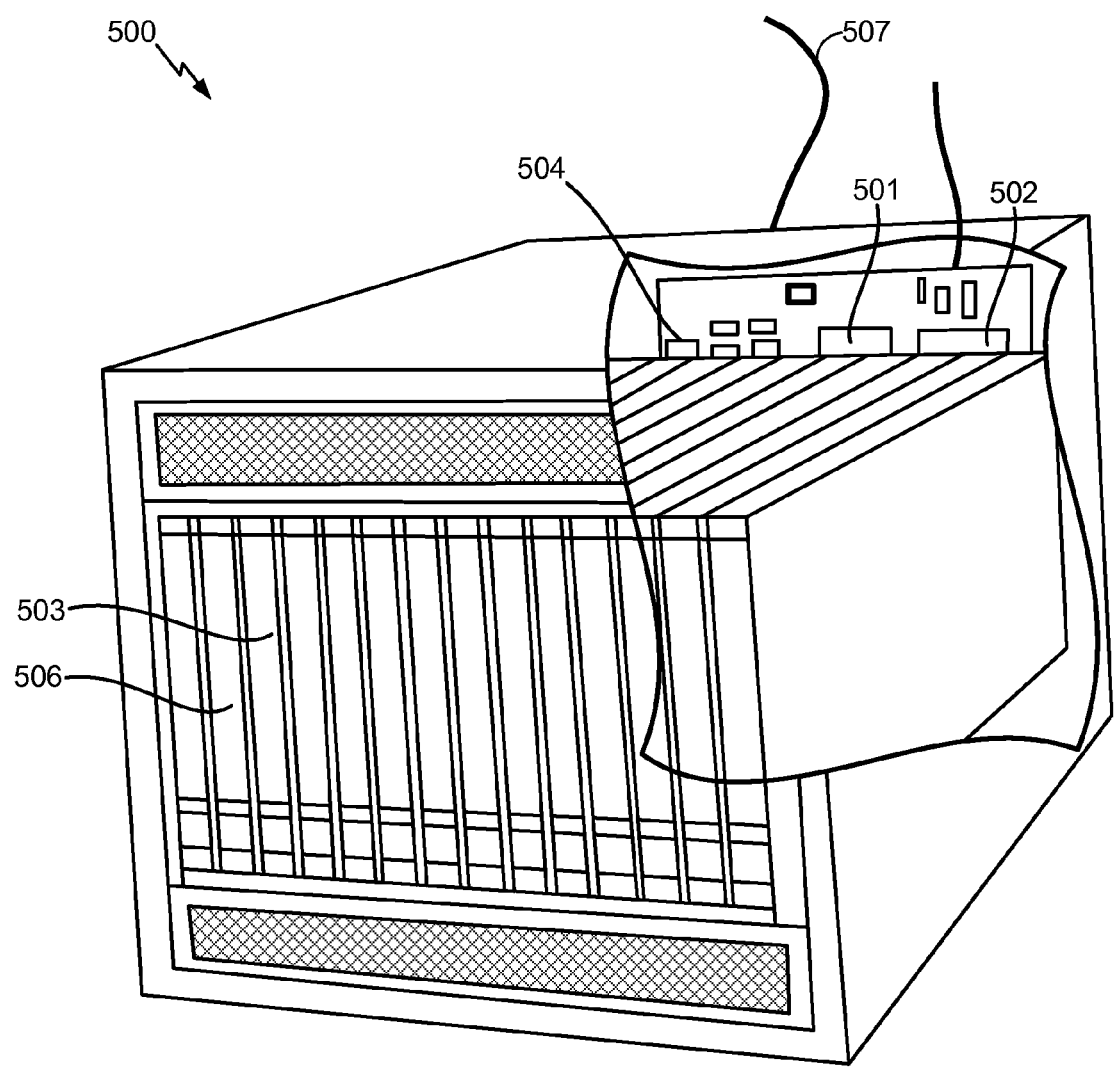
FIG. 5 illustrates a server in accordance with an aspect of the disclosure.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Figure 6:
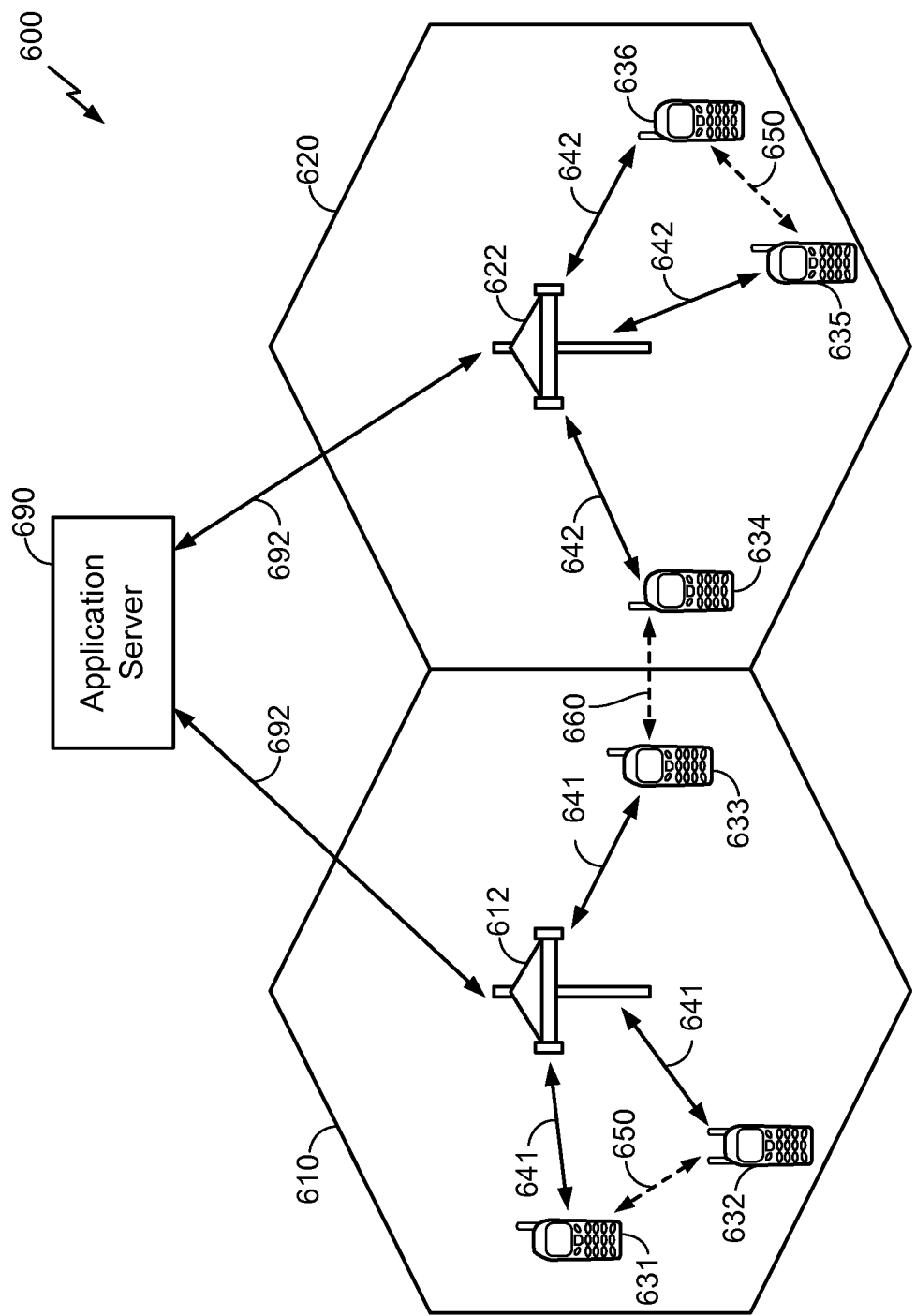
FIG. 6 illustrates a communications environment in which UEs can communicate using peer-to-peer technology.

FIG. 6 illustrates a wireless communications system 600 whereby a given UE can either connect directly to other UEs using P2P technology (e.g., LTE-D, WiFi Direct, Bluetooth, etc.) or connect to a Wireless Wide Area Network, such as, for example, an LTE network. Referring to FIG. 6, an application server 690 (e.g., the application server 170 in FIG. 1, FIG. 2, etc.) is connected to a first cell 610 having a first base station 612, a second cell 620 having a second base station 622, and the application server 690 coupled to the first base station 612 and the second base station 622 via a network link 692 (e.g., the Rx link of FIG. 2, etc.). The radio access area, or coverage area, of a given base station is represented by the cell in which the given base station is located, whereby for purposes of discussion, the first cell 610 includes the coverage area corresponding to the first base station 612 and the second cell 620 includes the coverage area corresponding to the second base station 622. Each the cells 610, 620 in the wireless communications system 600 include various UEs that communicate with the respective base stations 612, 622 and with the application server 690 via the respective base stations 612, 622. For example, in the embodiment illustrated in FIG. 6, the first cell 610 includes UE 631, UE 632, and UE 633, while the second cell 620 includes UE 635, UE 636, and UE 634, wherein one or more of the UEs in the wireless communications system 600 may be mobile or other wireless devices. Although not shown in FIG. 6, in some embodiments the base stations 612, 622 may be connected to one another via a backhaul link.

In accordance with various exemplary embodiments described herein, one or more of UE 631, UE 632, UE 633, UE 635, UE 636, and UE 634 may support direct P2P communications, e.g., D2D communications, whereby such UEs may support communicating with one another directly without having to communicate through another device or a network infrastructure element such as the first base station 612 and the second base station 622 and also support communications through the network infrastructure elements such as the first base station 612 and/or the second base station 622. In communications that involve network infrastructure, signals may generally be transmitted and received through uplink and downlink connections between various UEs and the base stations 612, 622, such as link 641 in the first cell 610 and link 642 in the second cell 620. Each of the base stations 612, 622 generally serve as the attachment point for the UEs in the corresponding cells 610, 620 and facilitate communications between the UEs served therein. In accordance with one aspect, when two or more UEs, such as UE 631 and UE 632, wish to communicate with one another and are located in sufficient proximity to each other, then a direct P2P link can be established there between, which may offload traffic from the base station 612 serving the UEs 631, 632, allow UEs 631, 632 to communicate more efficiently, or provide other advantages that will be apparent to those skilled in the art.

As shown in FIG. 6, the UE 631 can communicate with UE 632 through intermediate base station 612 via link 642, and UEs 631, 632 may further communicate via a P2P link 650. Similarly, UEs 635, 636 may communicate through intermediate base station 622 via link 642, and further communicate via a P2P link 650. Furthermore, for inter-cell communications where the participating UEs are in different nearby cells, a direct P2P communications link is still a possibility, which is illustrated in FIG. 6 where UE 633 and UE 634 may communicate using direct P2P communications illustrated by P2P link 660.

Figure 7:
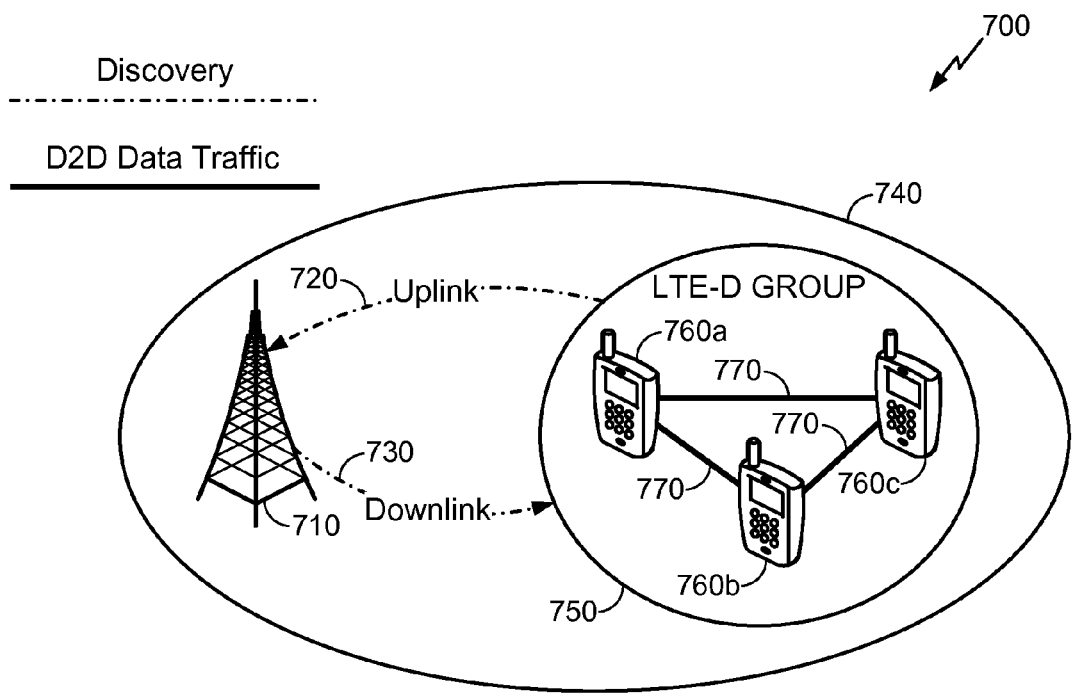
FIG. 7 illustrates an LTE communications system in which UEs can communicate using LTE-D group session communications.
Figure 8:
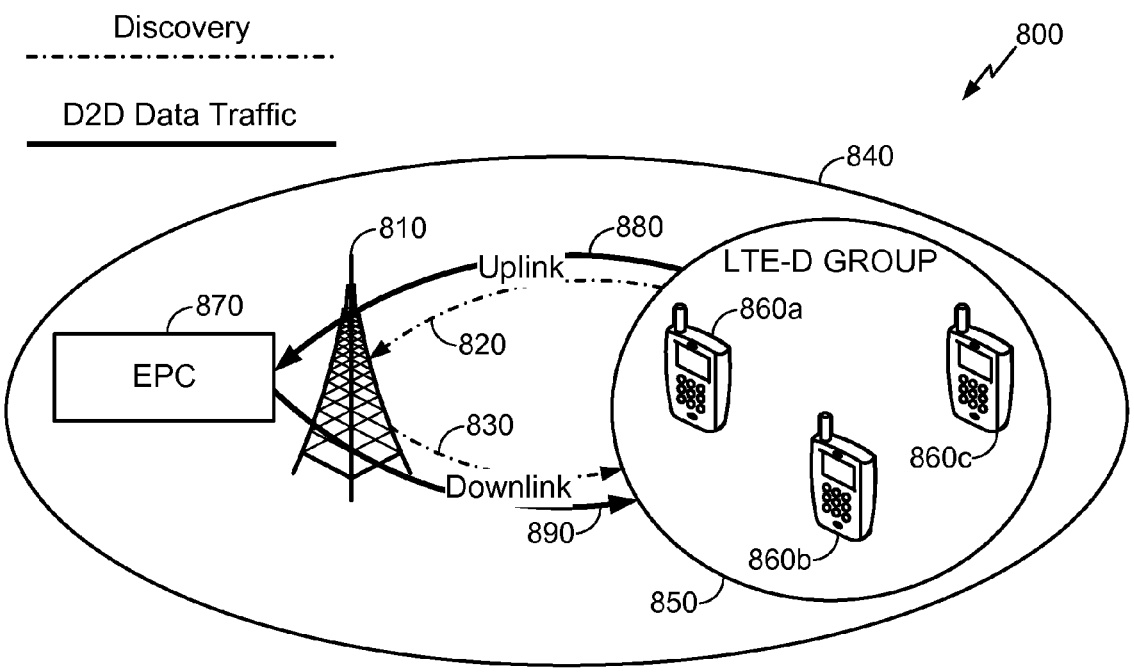
FIG. 8 illustrates an alternative LTE communications system in which UEs can communicate using LTE-D group session communications.

In one possible scenario, P2P link 650 and P2P link 660 are D2D links utilizing LTE-D technology. LTE-D is a proposed 3GPP Release 12 D2D solution for proximate discovery. LTE-D dispenses with location tracking and network calls by directly monitoring for services on other LTE-D devices within a large range (~500 m, line of sight). It does so continuously in a synchronous system that is battery efficient, and can concurrently detect thousands of services in proximity. LTE-D has a wider range than other D2D P2P technologies, such as WiFi Direct (WFD) or Bluetooth. Two alternative communications systems for implementing LTE-D communication sessions are depicted in FIG. 7 and FIG. 8. In the system of FIG. 7, an LTE-D group 750 is formed within an LTE wireless communication system 700 without network assistance. In the system of FIG. 8, by contrast, an LTE-D group 850 is formed within an LTE wireless communication system 800 with the network assistance of evolved packet core (EPC) 870.

In FIG. 7, the LTE wireless communication system 700 is associated with a base station 710 (e.g., eNB 200 through 210, base station 612, base station 622, etc.). The base station 710 communicates on uplink 720 and downlink 730 with a first UE 760*a*, a second UE 760*b*, and a third UE 760*c* (e.g., UE 300A, 300B, etc.). The LTE wireless communication system 700 has an LTE coverage area 740. Although only three UEs 760*a* . . . *c* are depicted, it will be understood that any number of UEs may be included in the LTE-D group 750. Moreover, the LTE-D group 750 is formed with D2D data traffic link 770 transmitted among UE 760*a*, UE 760*b*, and UE 760*c*.

In FIG. 8, the LTE wireless communication system 800 is associated with a base station 810 (e.g., eNB 200 through 210, base station 612, base station 622, etc.). The base station 810 communicates on uplink 820 and downlink 830 with a first UE 860*a*, a second UE 860*b*, and a third UE 860*c* (e.g., UE 300A, 300B, etc.). The LTE wireless communication system 800 has an LTE coverage area 840. An LTE-D group 850 is formed among UE 860*a*, UE 860*b*, and UE 860*c* (e.g., UE 300A, 300B, etc.). Although only three UEs 860*a* . . . *c* are depicted, it will be understood that any number of UEs may be included in the LTE-D group 850. The D2D data traffic link 880 and the D2D data traffic link 890 route D2D data traffic among the members of the LTE-D group 850 with assistance from the EPC 870.

The LTE-D group 750 and the LTE-D group 850 may exchange data in the form of a P2P group session communication. A P2P group session communication may refer to any media exchange activity. The P2P group session may be set up using a signaling exchange in accordance with, for example, session initiation protocols (SIP). For example, an SIP INVITE code may be used to indicate to a UE (e.g., first UE 860*a*, etc.) that the UE is invited to participate in a P2P group session. The UE may return an SIP 200 OK code that includes information on the UE's capabilities. An SIP ACK code may be used to confirm that the SIP 200 OK code, or some other code, has been received. Other suitable signaling exchanges for initiating or setting up a P2P group session may be utilized. After the group session has been initiated, media may be exchanged, including real time media exchange of streamed voice or video using, for example, Real-time Transport Protocol (TRP), or non-real time data transfer using, for example, Message Session Relay Protocol (MSRP).

As noted above, LTE wireless communication system 700 and LTE wireless communication system 800 facilitate formation of the LTE-D groups. LTE-D group 750, for example, utilizes a D2D data traffic link 770 to facilitate communication between member UEs 760*a* . . . *c*. However, a problem arises when one of the member UEs 760*a* . . . *c* exits the radio access coverage area 740 of the LTE wireless communication system 700. Solutions are needed for seamless continuation of communications among members of an LTE-D group when one of the members exits the coverage area of the LTE network.

Figure 9:
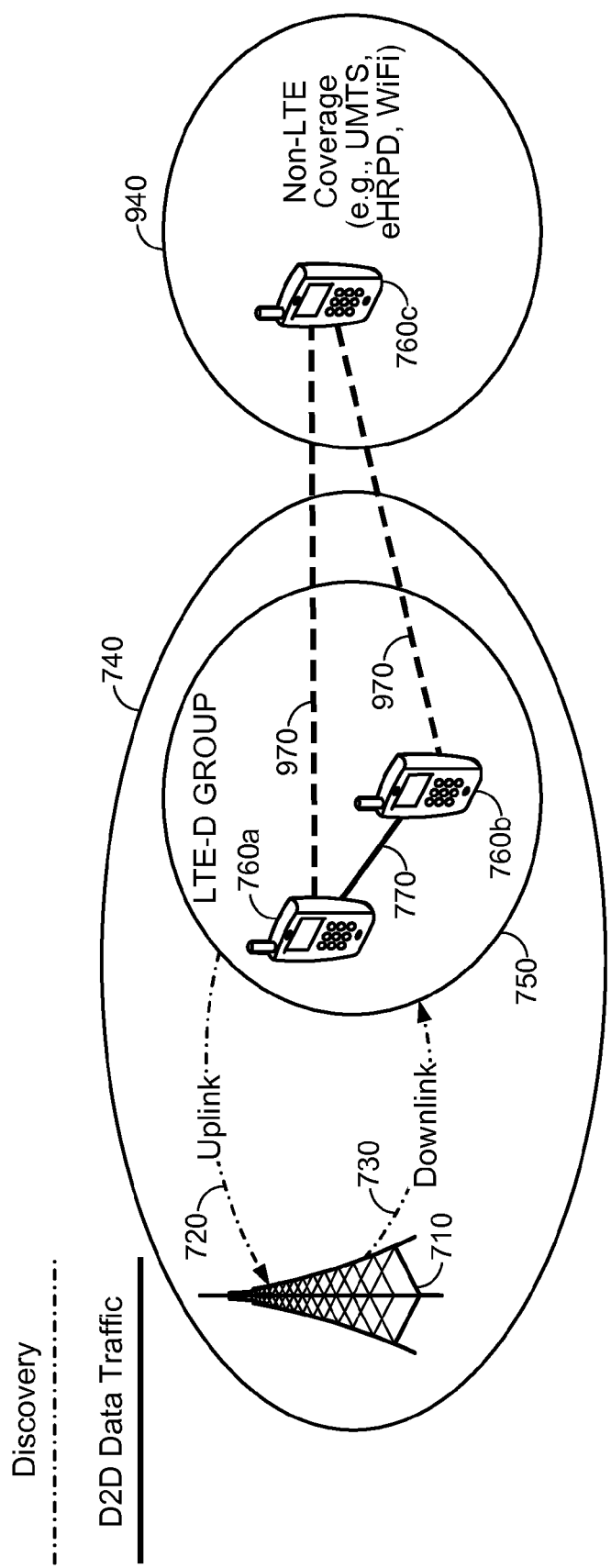
FIG. 9 illustrates a scenario where a member of the LTE-D group session illustrated in FIG. 7 exits a coverage area of the LTE communications system.

FIG. 9 illustrates a scenario where member UE 760*c* of the LTE-D group 750 depicted in FIG. 7 exits the LTE coverage area 740 and enters a non-LTE coverage area 940. The non-LTE coverage area 940 may be, for example, a UMTS radio access coverage area, a GERAN radio access coverage area, an eHRPD radio access coverage area, a WiFi radio access coverage area, or any other area served by a non-LTE radio access technology. It will be understood that the systems and methods described herein may be used to provide seamless continuity in intra-LTE handovers between different LTE coverage area, for example, in a handover from an S-eNode B coverage area to a T-eNode B coverage area. However, for the sake of convenience and clarity, the handover coverage area will be referred to as a "non-LTE" coverage area.

The remaining members of the LTE-D group 750 (UE 760*a* and UE 760*b* in this scenario) are still communicating with one another on the D2D data traffic link 770. However, because UE 760*c* exits the LTE coverage area 740, the D2D data traffic link 770 breaks, and the remaining UEs 760a and 760b are unable to communicate with UE 760c. The broken D2D data traffic link 970 represents, for example, a failed, broken, or incomplete D2D data transmission between a UE 760a or 760b within the LTE coverage area 740 and a UE 760c in the non-LTE coverage area 940.

Figure 10:
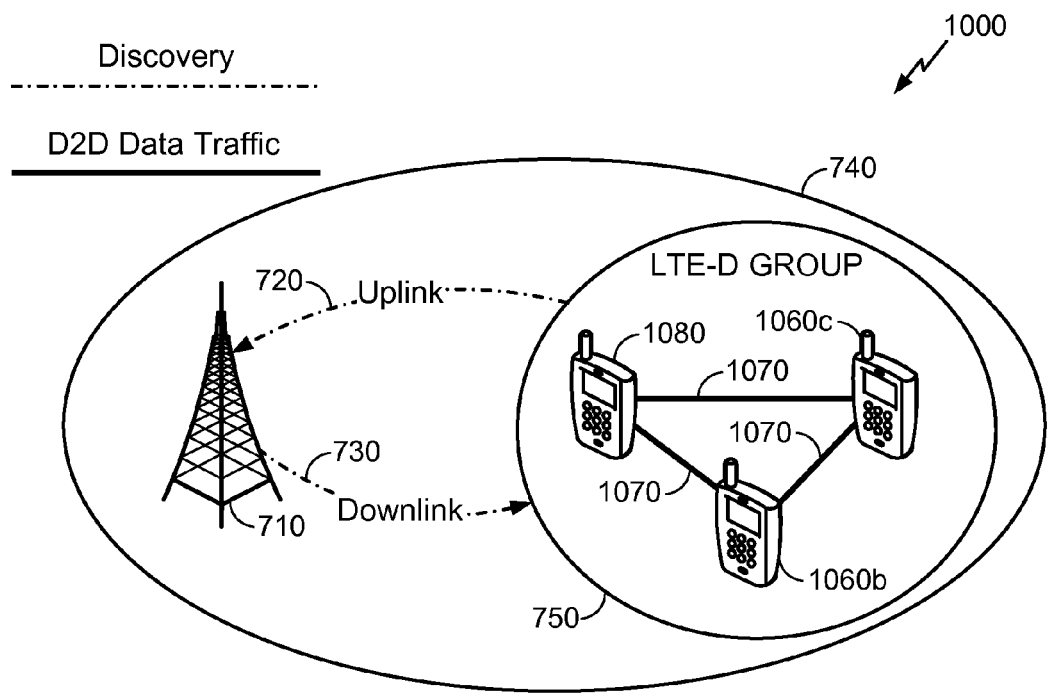
FIG. 10 illustrates a scenario where a member of the LTE-D group session illustrated in FIG. 7 has been selected as a proxy UE.

FIG. 10 illustrates an LTE wireless communications system 1000 in accordance with an aspect of the disclosure. Similarly to the LTE wireless communications system 700, the LTE wireless communication system 1000 is associated with a base station 710, which communicates on uplink 720 and downlink 730 with the UEs within its coverage area 740. Although only three UEs 1080, 1060b . . . c are depicted, it will be understood that any number of UEs may be included in the LTE-D group 750. Moreover, the LTE-D group 750 is formed with D2D data traffic link 1070 transmitted among UEs 1080, 1060b . . . c. The LTE-D group 750 includes at least one proxy UE 1080 which is selected from among the plurality of member UEs within the LTE-D group 750 (e.g., UEs 760a . . . c). The proxy UE 1080 may be selected in accordance with the flow diagram illustrated in FIG. 11.

Figure 11:
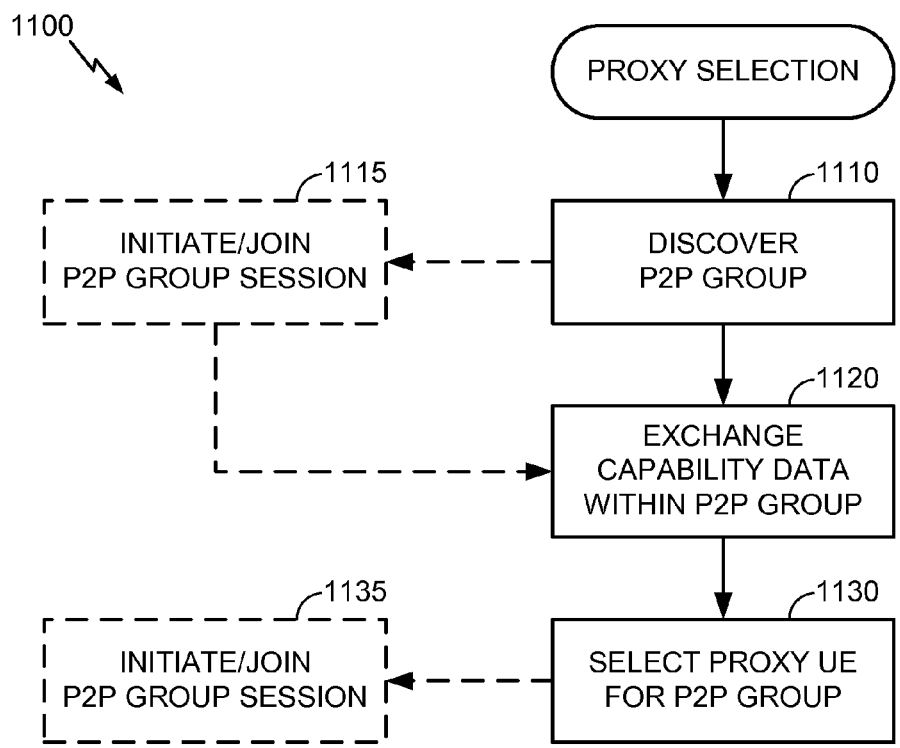
FIG. 11 illustrates a flow diagram of a method for selecting a proxy UE.

In accordance with an aspect of the disclosure, FIG. 11 illustrates a flow diagram 1100 according to which a UE (e.g., UE 300A, UE 300B, UE 1060b, etc.) selects a proxy UE (e.g., proxy UE 1080, etc.) from within an LTE-D group (e.g., LTE-D group 750, LTE-D group 850, etc.). At 1110, a P2P group is discovered. P2P group discovery 1110 may comprise, for example, LTE-D group discovery as set forth in FIG. 6 and the related disclosure.

UEs that perform LTE-D communications rely upon "expressions" to facilitate discovery of and communication with proximate peers. Expressions at the application or service layer are referred to as "expression names" (e.g., ShirtSale@Gap.com, Jane@Facebook.com, etc.). Expression names at the application layer are mapped to bit-strings at the physical layer that are referred to as "expression codes". Discovery in LTE-D operates in a synchronous manner based on parameters that are configured by the LTE network itself (e.g., LTE wireless communications system 1000, etc.). For example, frequency division duplexing (FDD) and/or time division duplexing (TDD) may be assigned by a serving eNode B (e.g., base station 710, etc.) via a physical layer Session Information Block (SIB). The serving eNode B can also configure an interval at which LTE-D devices are to announce themselves (e.g., every 20 seconds, etc.) via transmission of a discovery message. In accordance with the proxy selection depicted in flow diagram 1100, a UE may perform P2P group discovery 1110 in compliance with any of the aforementioned LTE-D processes described herein. After two or more LTE-D devices discover each other, the LTE network may be required to authorize establishment of the LTE-D session, referred to herein as network assisted connection setup. P2P group discovery 1110 may further comprise any UE operations necessary to enable network assisted connection setup.

At 1115, the UE optionally initiates a P2P group session or joins an initiated P2P group session that was discovered at 1110. The P2P group may comprise an LTE-D group (e.g., LTE-D group 750, LTE-D group 850, etc.). Once the optional P2P group initiation/joining 1115 is complete, the members of the P2P group may communicate using D2D data traffic links (e.g., D2D data traffic link 770, D2D data traffic link 1070, etc.).

At 1120, the UE exchanges capability data with one or more other UEs within the P2P group. Generally, capability data may comprise any data that relates to the suitability of a UE to serve as a proxy UE for the P2P group (e.g., proxy UE 1080 of LTE-D group 750, etc.).

In one possible example of capability data exchange 1120, a first UE 1060b collects first capability data on at least one characteristic of the first UE 1060b. The characteristic may be any characteristic that relates to the suitability of the first UE 1060b for serving as a proxy UE. The characteristic may comprise wireless access (e.g., wireless local area network (WLAN) access, RAN access, etc.), wireless coverage (signal strength, etc.), maximum battery life, remaining battery life, maximum processing power, available processing power, or the like. In another possible scenario, the capability data includes data relating to a plurality of characteristics.

The capability data may be exchanged using a D2D data traffic link (e.g., D2D data traffic link 1070, etc.), uplink and downlink via a base station (e.g., uplink 720, downlink 730, etc.) or by any other suitable transmission method. To return to the example of capability data exchange 1120 involving first UE 1060b, capability data collection may be followed by transmission of the first capability data to at least one second UE 1060c. The first capability data may further be transmitted to each UE within the LTE-D group 750. In addition, the first UE 1060b may also receive second capability data from the second UE 1060c. The second capability data may further be received from each UE within the LTE-D group 750. The second capability data associated with, for example, second UE 1060c, may be collected by second UE 1060c in the same manner that the first capability data was collected by the first UE 1060b. In one possible scenario, each UE in a P2P group, for example, LTE-D group 750, collects capability data regarding its own suitability for serving as proxy UE, transmits the collected capability data to each of the other UEs in the P2P group, and receives collected capability data from each of the other UEs in the P2P group.

At 1130, the UE selects a proxy UE (e.g., proxy UE 1080, etc.) from among the UEs in the P2P group (e.g., LTE-D group 750, etc.) on the basis of the capability data exchanged at 1120. As noted above, the capability data may comprise any data that relates to the suitability of a UE to serve as a proxy UE for the P2P group. For example, a UE with a high level of WLAN access may be associated with a greater suitability to serve as the proxy UE, and the UE may be selected as the proxy UE on that basis. In another example, a UE with a high level of battery life or a high level of available processing power may be associated with a greater suitability to server as the proxy UE, and the UE may be selected as the proxy UE on that basis. In yet another example, proxy UE selection is made primarily on the basis of WLAN access, whereas battery life and processing power characteristics are of secondary importance.

At 1135, the UE optionally initiates a P2P group session or joins an initiated P2P group session which was discovered at 1110. If optional P2P group initiation/joining 1115 was omitted, then the UE may initiate/join the P2P group session at 1135 instead. It will be further understood that the UE may alternatively initiate/join the discovered P2P group session between capability data exchange 1120 and proxy UE selection 1130, or omit initiation/joining entirely.

In one possible example of proxy UE selection 1130, a first UE 1060b, after exchanging capability data at 1120 with at least one second UE 1060c, selects a proxy UE by ranking the first UE 1060b and the at least one second UE 1060c on the basis of the exchanged capability data. At 1130, the first UE 1060b selects the proxy UE on the basis of the rankings.

It will be understood that the proxy selection depicted in flow diagram 1100 is performed by a single UE. Moreover, each UE in a given coverage area (e.g., LTE coverage area 740, LTE coverage area 840, etc.) or a portion thereof may individually perform the proxy selection depicted in flow diagram 1100.

In one possible scenario, each UE in the LTE-D group 750 independently selects the proxy UE 1080 in accordance with the proxy selection depicted in flow diagram 1100. In this scenario, this capability data is exchanged at 1120 among each of the plurality of UEs in the LTE-D group 750 such that each of the plurality of UEs uses the same data to select the proxy UE 1080. Moreover, suitability to serve as proxy UE is determined according to a predetermined formula or algorithm such that each of the plurality of UEs in the LTE-D group 750 independently comes to the same conclusion at 1130 as to which of the plurality of UEs should be selected as the proxy UE. Optionally, the proxy UE 1080 acknowledges its selection with an acknowledge message transmitted to one or more of the unselected members UEs in the LTE-D group 750. The proxy selection depicted in flow diagram 1100 may conclude with transmission of this acknowledge message (if 1100 is performed by the member UE that happens to be selected as the proxy UE 1080) or receipt of the acknowledge message from the proxy UE 1080 (if 1100 is performed by an unselected member UE).

In another possible scenario, a single UE is arbitrarily selected to perform the proxy selection depicted in flow diagram 1100. The arbitrary selection may be on the basis of first to join the P2P group, originator of the P2P group, self-selection, random selection, or any other suitable basis. In this scenario, the selecting UE collects capability data regarding its own suitability to serve as in 1110, receives capability data from each of the other UEs in the P2P group as in 1120, and selects the proxy UE for the P2P group as in 1130. In this scenario proxy UE selection 1130 may further comprise a transmission to each member of the P2P group identifying which of the members is to serve as the proxy UE. In another possible scenario, the proxy UE 1080 continuously practices the proxy selection depicted in flow diagram 1100 and continues to perform as the proxy UE 1080 for as long as the proxy UE 1080 continues to be indicated at proxy UE selection 1130. In the event that another member UE is selected at proxy UE selection 1130, a message is transmitted to each member UE which identifies the new proxy UE.

Figure 12:
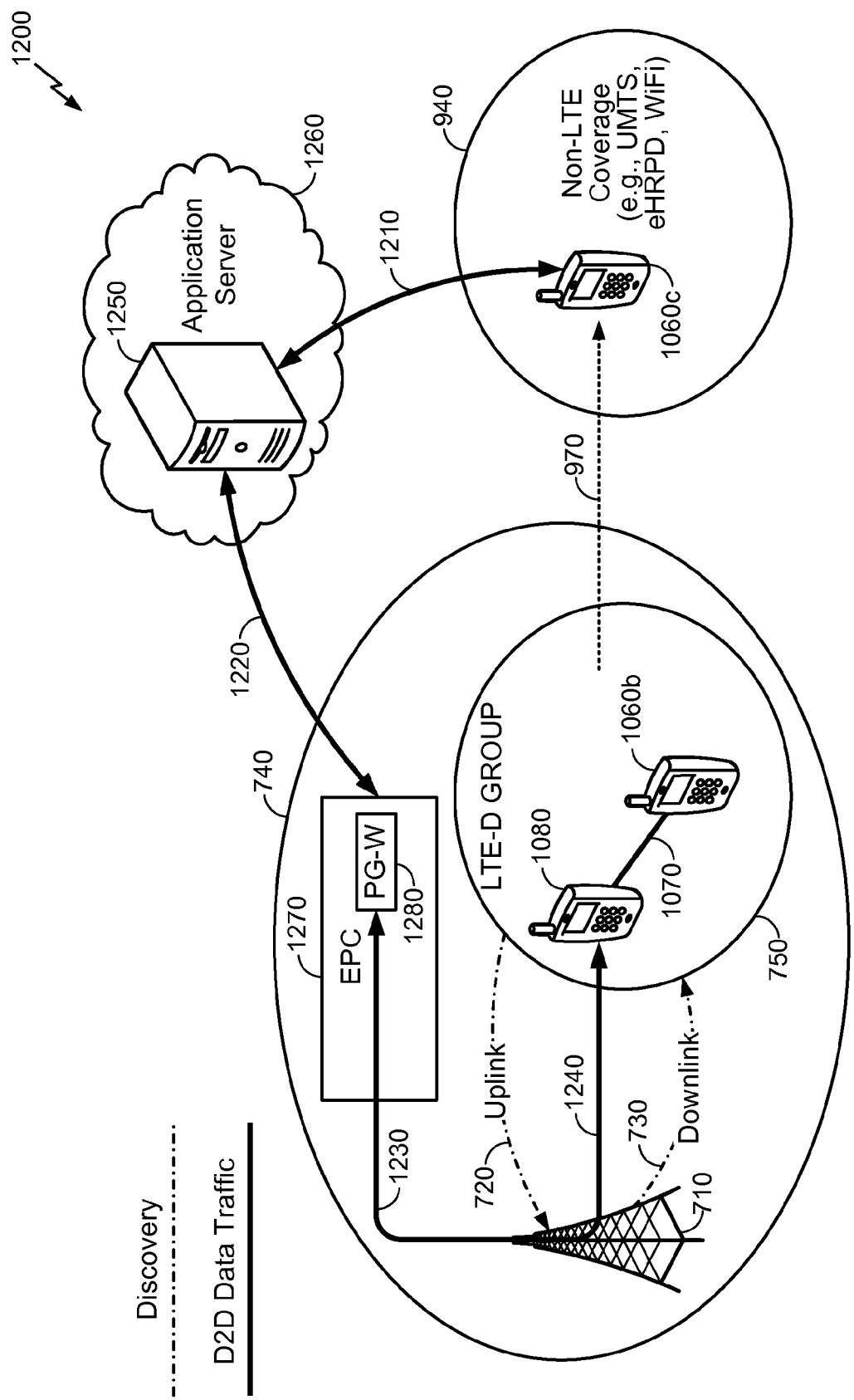
FIG. 12 illustrates a communications network that enables continuity maintenance of a peer-to-peer group session in accordance with an aspect of the disclosure.

FIG. 12 illustrates a communications network 1200 in accordance with an aspect of the disclosure. Similar to FIG. 10, a base station 710 communicates on uplink 720 and downlink 730 with an LTE-D group 750 comprising a proxy UE 1080 and a second UE 1060b. In contrast to FIG. 10, a handover UE 1060c has exited the LTE coverage area 740 associated with the base station 710. As a result, proxy UE 1080 and second UE 1060b continue to communicate on the D2D data traffic link 1070, but neither can communicate on the D2D data traffic link 1070 with the handover UE 1060c, which has exited the LTE coverage area 740. The broken D2D data traffic link 970 represents, for example, a failed D2D communication with the handover UE 1060c.

In FIG. 12, the handover UE 1060c has entered a non-LTE coverage area 940 similar to the non-LTE coverage area 940 depicted in FIG. 9. Because the D2D data traffic link 1070 no longer exists, the handover UE 1060c cannot experience seamless continuation of communication with the remaining members of the LTE-D group 750 unless other links are utilized. FIG. 12 shows a first link 1210 between the handover UE 1060c and an application server 1250. Other intervening elements 1260 may facilitate establishment and/or utilization of the first link 1210. These intervening elements 1260 may comprise one or more of the elements depicted in FIGS. 1 through 6 (including, for example, RAN 120, core network 140, and/or internet 175). Alternatively, the intervening elements 1260 may be omitted entirely. Also depicted is a second link 1220 between the application server 1250 and a radio access network similar to RAN 140 as shown in any of FIG. 1 and FIG. 2. The RAN 140 is shown as an evolved packet core 1270 and packet gateway 1280, similar to the elements depicted in FIG. 2. In some scenarios, the intervening elements 1260 are used, not used, or reused to assist in the establishment and/or utilization of the second link 1220. The second link 1220 may be established and/or utilized using the Rx or SGi signals described above in relation to FIG. 2. Also depicted is a third link 1230 between the RAN (depicted as an evolved packet core 1270 and packet gateway 1280) and the base station 710. The third link 1230 may be established and utilized using the Si signals described above in relation to FIG. 2. Finally, a fourth link 1240 is established and/or utilized between the base station 710 and the proxy UE 1080. By utilizing these links, the handover UE 1060c can seamlessly maintain communications with the proxy UE 1080. Moreover, the proxy UE 1080 can be used to relay communications between handover UE 1060c and one or more remaining members of the LTE-D group 750, for example, second UE 1060b.

It will further be understood that one or more additional handover UEs similar to handover UE 1060c may exit the LTE coverage area 740 and enter non-LTE coverage area 940. Alternatively, the additional handover UEs may enter an entirely different non-LTE coverage area. Each of these additional handover UEs may simultaneously maintain seamless continuity with the remaining members of the LTE-D group 750 so long as one member remains in the LTE coverage area 740 to serve as the proxy UE 1080.

It will be understood that, as circumstances change, a new proxy UE may be selected. In a first possible scenario, the proxy UE 1080 leaves the LTE coverage area 740. In this scenario, a new proxy UE is selected in accordance with the proxy selection depicted in flow diagram 1100, or a modification thereof. In a second possible scenario, the proxy UE 1080 does not leave the LTE coverage 740, but a newly joining UE, previously not a member of the LTE-D group 750, newly joins the LTE-D group 750, thereby affording an opportunity to select a new and (potentially) more suitable proxy UE. In a third possible scenario, the capability data associated with one or more of the UEs in the LTE-D group 750 changes, and the proxy UE 1080 is no longer the most suitable UE to serve as the proxy UE.

In each of the foregoing scenarios, the proxy selection depicted in flow diagram 1100 may be modified such that P2P group discovery 1110 and P2P group joining 1115 are omitted. Instead, capability data exchange 1120 is triggered by any one of a number of circumstances. According to the first scenario, the proxy UE 1080 may conclude that exit from the LTE coverage area 740 (and entry into a non-LTE coverage area 940) is imminent and may further communicate this conclusion to the members of the LTE-D group 750. Such a communication would trigger a capability data exchange 1120 among the members of the LTE-D group 750 still to remain within the coverage area 740. (It will be understood that those members of the LTE-D group 750 which are outside of the LTE coverage area 740, e.g., handover UE handover UE 1060c, need not participate in the capability data exchange 1120.) Alternatively, the base station 710 may conclude that proxy UE 1080 has left the LTE coverage area 740 and communicate this conclusion to the LTE-D group 750. A conclusion that proxy 1080 is powering down, leaving the LTE-D group 750, or entering a non-LTE coverage area 940 may also trigger selection of a new proxy UE.

According to the second scenario, each joining of a new UE to the LTE-D group 750 triggers selection of a new proxy UE. According to the third scenario, the proxy UE 1080 may conclude that its suitability to serve as the proxy UE has decreased, and initiate an exchange of capability data 1120. Alternatively, a member of the LTE-D group 750 within the LTE coverage area 740 may conclude that its suitability to serve as the proxy UE has increased, an initiate an exchange of capability data 1120. In yet another implementation, an exchange of capability data 1120 is triggered at intermittent intervals for all UEs that are within the LTE coverage area 740, or members of the LTE-D group 750.

Figure 13:
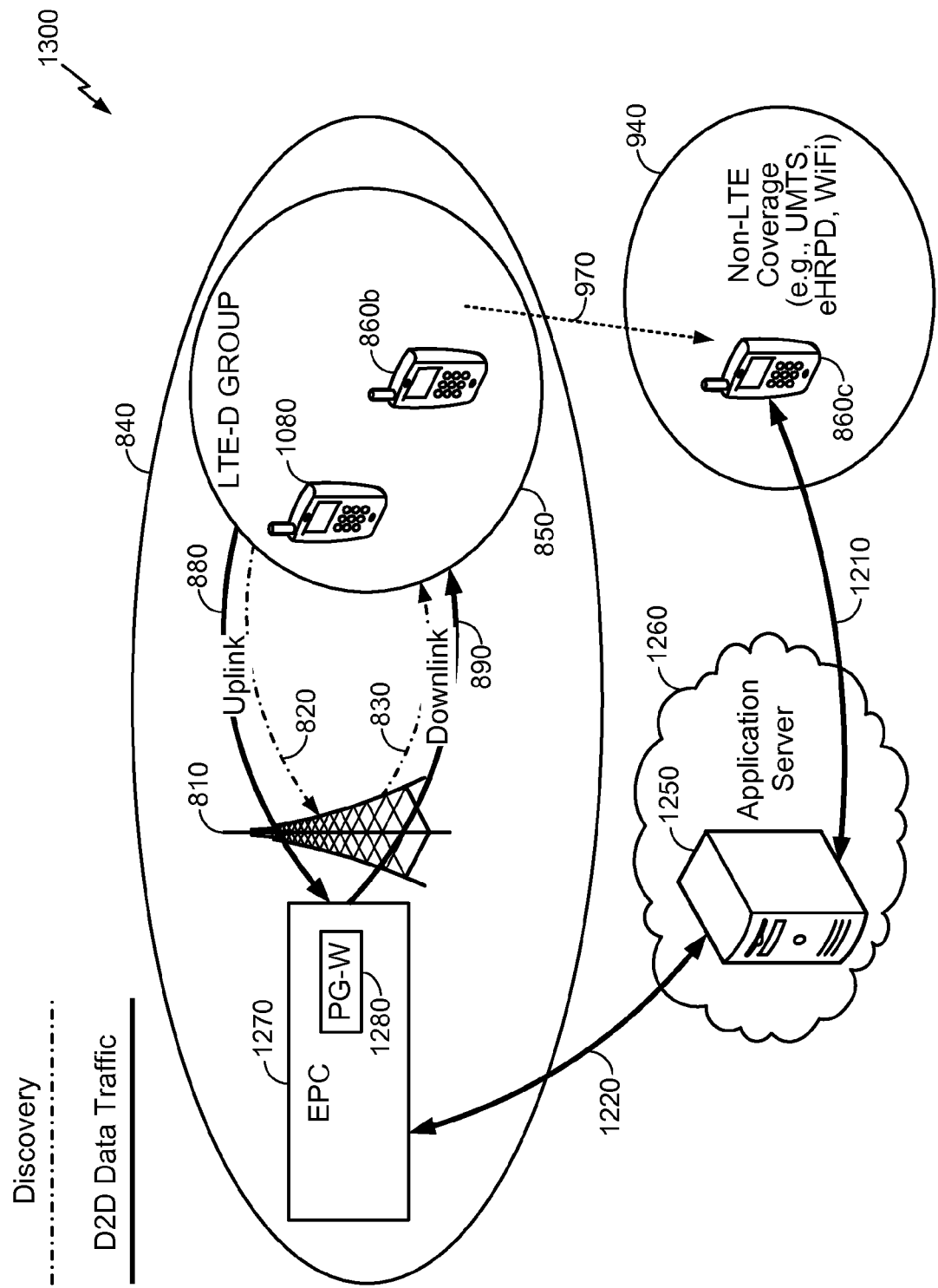
FIG. 13 illustrates an communications network that enables continuity maintenance of a peer-to-peer group session in accordance with another aspect of the disclosure.

FIG. 13 illustrates a communications network 1300 in accordance with an aspect of the disclosure. The communications network 1300 is similar to the communications network 1200 of FIG. 12, except that it adopts the arrangement of FIG. 8 rather than the arrangement of FIG. 7. As noted above, the LTE-D group 850 depicted in FIG. 8 is formed and maintained with the network assistance of evolved packet core (EPC) 870, whereas the LTE-D group 750 depicted in FIG. 7 is formed and maintained without such assistance. Similarly, the LTE-D group 850 depicted in FIG. 13 is formed and maintained with the network assistance of EPC 1350, whereas the LTE-D group 750 depicted in FIG. 12 is formed and maintained without such assistance.

In FIG. 13, a handover UE 860c experiences seamless continuation of communication with the remaining members of the LTE-D group 850 by establishing and utilizing other links. FIG. 13 shows a first link 1210 between the handover UE 860c and the application server 1250. The optional intervening elements 1260 may facilitate establishment and/or utilization of the first link 1210. The second link 1220 is established between the application server 1250 and the RAN 140 (shown as an evolved packet core 1270 and packet gateway 1280, similar to analogous elements depicted in FIG. 2). In some scenarios, the intervening elements 1260 are used, not used, or reused to assist in the establishment and/or utilization of the second link 1220. Instead of the third link 1230 and fourth link 1240 depicted in FIG. 12, the communications network 1300 utilizes the D2D data traffic link 880 and the D2D data traffic link 890 to route D2D data traffic among the remaining members of the LTE-D group 850, UE 860a and UE 860b.

FIG. 13 shows a proxy UE 1080 which is selected from among the plurality of member UEs within the LTE-D group 850 (e.g., the UEs 860a . . . c depicted in FIG. 8). The proxy UE 1080 may be selected in accordance with the flow diagram illustrated in FIG. 11. FIG. 13 also shows a second UE 860b which represents one or more UEs belonging to the LTE-D group 850 which are not selected as the proxy UE 1080. Just as in FIG. 12, the proxy UE 1080 as depicted in FIG. 13 can be used to relay communications between handover UE 860c and one or more remaining members of the LTE-D group 850, for example, second UE 860b.

Figure 14:
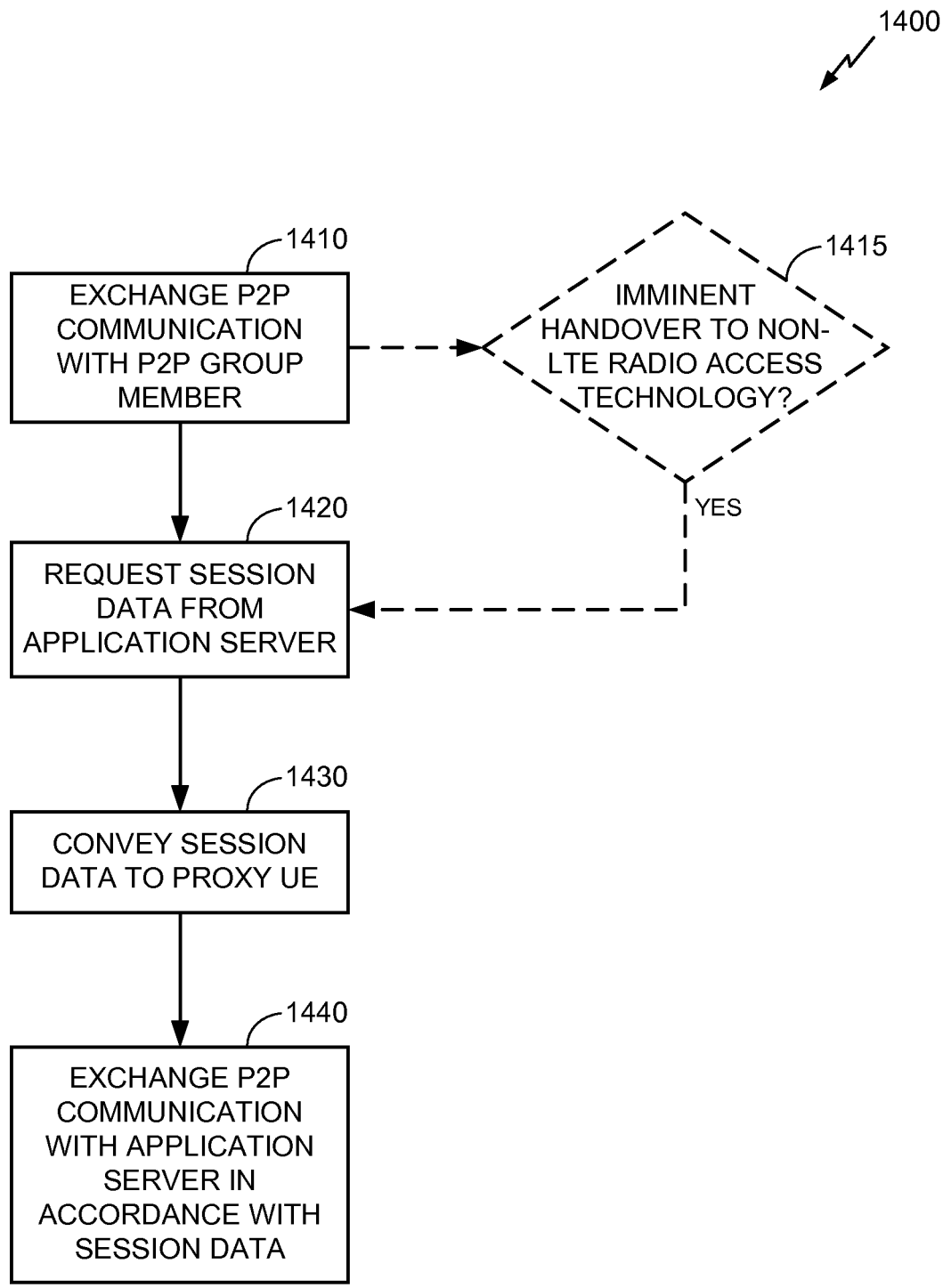
FIG. 14 illustrates a flow diagram of a method for maintaining continuity of a peer-to-peer group session when a member of the peer-to-peer group exits the immediate coverage area in accordance with an aspect of the disclosure.

In accordance with an aspect of the disclosure, FIG. 14 illustrates a flow diagram 1400 according to which a UE (e.g., UE 300A, UE 300B, UE 1060c, etc.) maintains P2P group session continuity with members of an LTE-D group (e.g., LTE-D group 750, LTE-D group 850 etc.) throughout handover to a non-LTE radio access technology. At 1410, a UE exchanges a first P2P group session communication with a member UE of an LTE-D group. As an example, see FIG. 10, in which UE 1060b and UE handover UE 1060c, both member of LTE-D group 750, exchange communications via D2D data traffic link 1070.

At 1420, the handover UE 1060c requests session data from an application server, for example, application server 1250 as depicted in FIG. 12. However, prior to requesting session data 1420, the handover UE 1060c may optionally make an imminent handover determination 1415 that a handover to a non-LTE radio access technology is imminent. The imminent handover determination 1415 may be particularly advantageous if handover UE 1060c is a multimode UE which fully utilizes both LTE radio access technologies and non-LTE radio access technologies. In this case, a system selection procedure may indicate that an inter-system handover is imminent, and this indication can be used to make the imminent handover determination 1415. In one possible scenario, the handover UE 1060c does not request session data 1420 unless it first makes an imminent handover determination 1415 that a handover to a non-LTE radio access technology is imminent.

On the other hand, the handover UE 1060c may determine to proceed to request session data 1420 without first making an imminent handover determination 1415 that a handover to a non-LTE radio access technology is imminent. In one possible scenario, the handover UE 1060c is a single mode UE which is not capable of making the imminent handover determination 1415. In this scenario, the handover UE 1060c may proceed to request session data 1420 in response to any number of suitable triggers, for example, at least one of discovering the P2P group session, joining the P2P group session, exchanging data within the P2P group session (as in 1410), identifying the proxy UE, communicating with the proxy UE, or a combination thereof.

Returning to 1420, the handover UE 1060c requests session data from application server 1250. The handover UE 1060c may communicate with the application server 1250 in accordance with any suitable method, including, but not limited to, those set forth in the present disclosure, for example, in FIG. 1, 2, or 6-8. The session data comprises any data that can be used by a UE (e.g., handover UE 1060c, proxy UE 1080, etc.) to locate, identify, and/or communicate with the application server 1250, or be located, be identified, or be communicated with by the application server 1250. Session data request 1420 may include processing necessary for re-sending the request, receiving a response to the request, and/or processing the response in preparation for session data conveyance 1430.

At 1430, the handover UE 1060c conveys session data to the proxy UE 1080. The handover UE 1060c may communicate with the proxy UE 1080 in accordance with any suitable method, including, but not limited to, those set forth in the present disclosure, for example, in FIG. 1, 2, or 6-8. It will be understood that the proxy UE 1080 may be selected or identified in accordance with any suitable process, including, but not limited to, the proxy UE selection processes set forth in the present disclosure, for example, the proxy UE selection process depicted in FIG. 11. Session data conveyance 1430 may include processing necessary for re-sending the conveyance and/or receiving a response to the conveyance.

At 1440, the handover UE 1060c exchanges a second P2P group session communication with the application server 1250. The exchange 1440 may occur prior, during, or after the handover UE 1060c has exited an LTE coverage area, for example, LTE coverage area 740, and may occur prior, during, or after the handover UE 1060*c* has entered a non-LTE coverage area, for example, non-LTE coverage area 940. The second P2P group session communication exchange 1440 may comprise transmission of data to the application server 1250 for purposes of relay to the LTE-D group 750 or reception of data from the application server 1250 which has been relayed from the LTE-D group 750.

Figure 15:
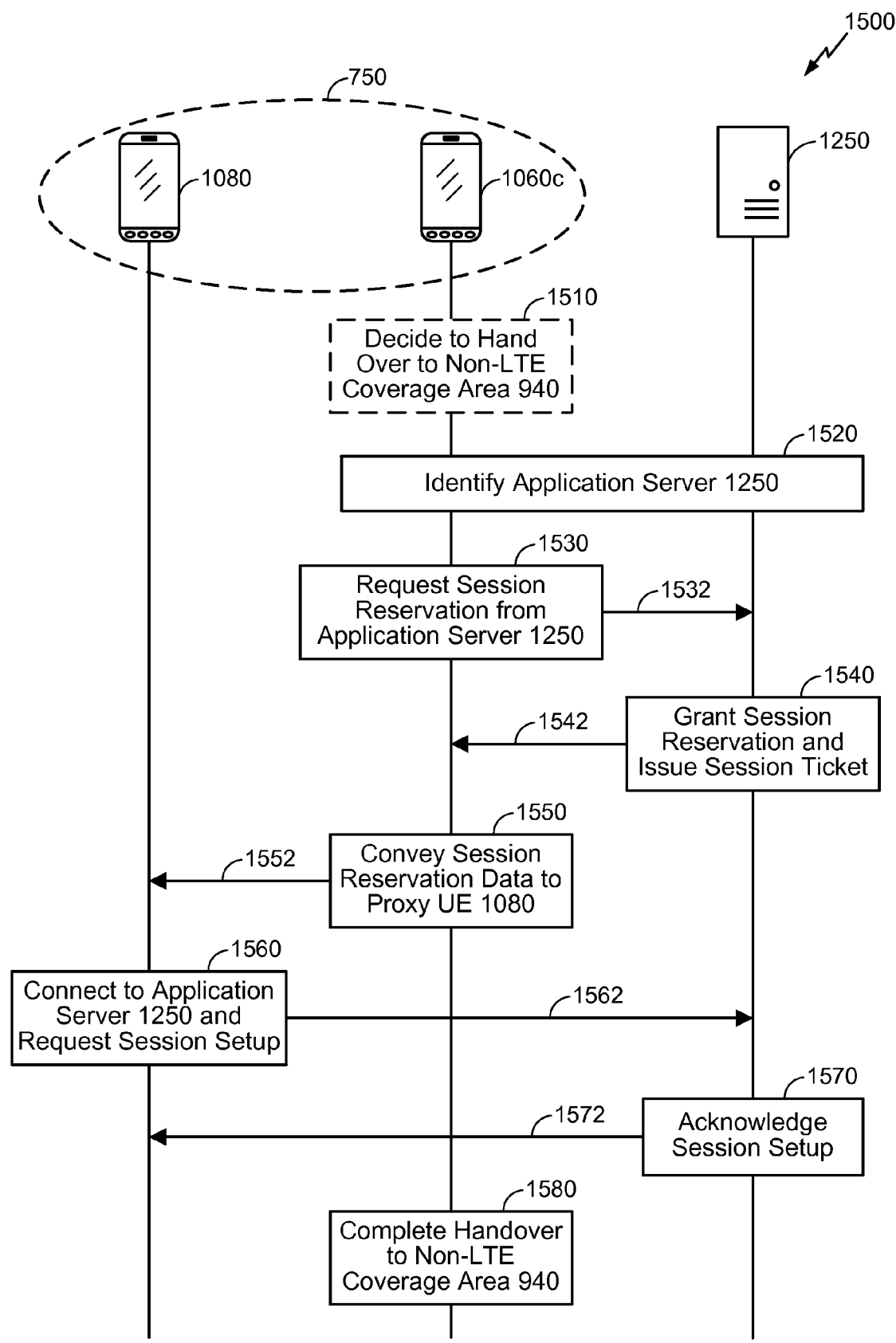
FIG. 15 illustrates a signaling flow diagram for signaling prior to a handover according to an aspect of the disclosure

FIG. 15 illustrates a signaling flow diagram 1500 for signaling prior to handover according to an aspect of the disclosure. In the flow diagram 1500, a proxy UE and handover UE (e.g., proxy UE 1080 and handover UE 1060*c* of FIG. 10, etc.) are depicted within an LTE-D group (e.g., LTE-D group 750. LTE-D group 850, etc.).

At 1510, the handover UE 1060*c* optionally decides to hand over to a non-LTE coverage area (e.g., non-LTE coverage area 940). As noted above with respect to FIG. 14, this decision may be omitted in accordance with design considerations. For single mode UEs in particular, it may be advantageous to begin the signaling flow 1500 with application server identification 1520.

At 1520, the handover UE 1060*c* identifies an application server (e.g., application server 1250, etc.). In one possible scenario, the application server identification 1520 comprises acquisition of the internet protocol address and port of the application server 1250 via a domain name server. Additionally or alternatively, this information may be pre-provisioned to the handover UE 1060*c*.

After application server identification 1520 is complete, the handover UE 1060*c* requests a session reservation at 1530. A session reservation request 1532 is sent to the application server 1250 in accordance with any suitable communications method. In one possible scenario, the session reservation request 1532 comprises a request for a session ticket. At 1540, in response to the session reservation request 1532, the application server 1250 may grant the session reservation and send a grant notification 1542 to the handover UE 1060*c*. The grant notification 1542 may comprise the aforementioned session ticket. The session ticket is analogous to a cookie that indexes the context of the group session at the application server 1250. The session ticket may comprise an application layer identifier used by the 1250 to identify one or more of a session, the users associated with the session, related data, or a combination thereof.

At 1550, session reservation data 1552 is sent to the proxy UE 1080 in accordance with any suitable communications method (e.g., via D2D data traffic link 1070, etc.). In one possible scenario, the session reservation data 1552 comprises the internet protocol address and port of the application server 1250, acquired by handover UE 1060*c* via the aforementioned domain name server. In another possible scenario, this information is pre-provisioned to both the handover UE 1060*c* and the proxy UE 1080, and the session reservation data 1552 need not contain it. The session reservation data 1552 may also comprise the aforementioned session ticket, thereby facilitating communication between the proxy UE 1080 and the application server 1250.

At 1560, the proxy UE 1080 connects to the application server 1250 and transmits a session setup request 1562. The session setup request 1562 may be sent in accordance with any suitable communications method (e.g., via uplink 720, etc.). The session setup request 1562 may comprise or allude to the aforementioned session ticket. Additionally or alternatively, the session setup request 1562 may comprise one or more of a session ID (e.g., a group uniform resource identifier (URI)), a user identifier (e.g., a phone number), or a combination thereof. At 1570, the application server 1250 acknowledges that the session setup request 1562 has been received in an acknowledgement 1572. At 1580, the handover UE 1060*c* completes handover to the non-LTE coverage area 940. In one possible scenario, handover is completed in accordance with a system selection procedure. Additionally or alternatively, the handover UE 1060*c* may wait for an acknowledgement from one or more of proxy UE 1080 and/or application server 1250 that, for example, the session reservation data 1552 has been received by the proxy UE 1080, or that the session has been set up. In another possible scenario, handover completion 1580 is omitted.

Figure 16:
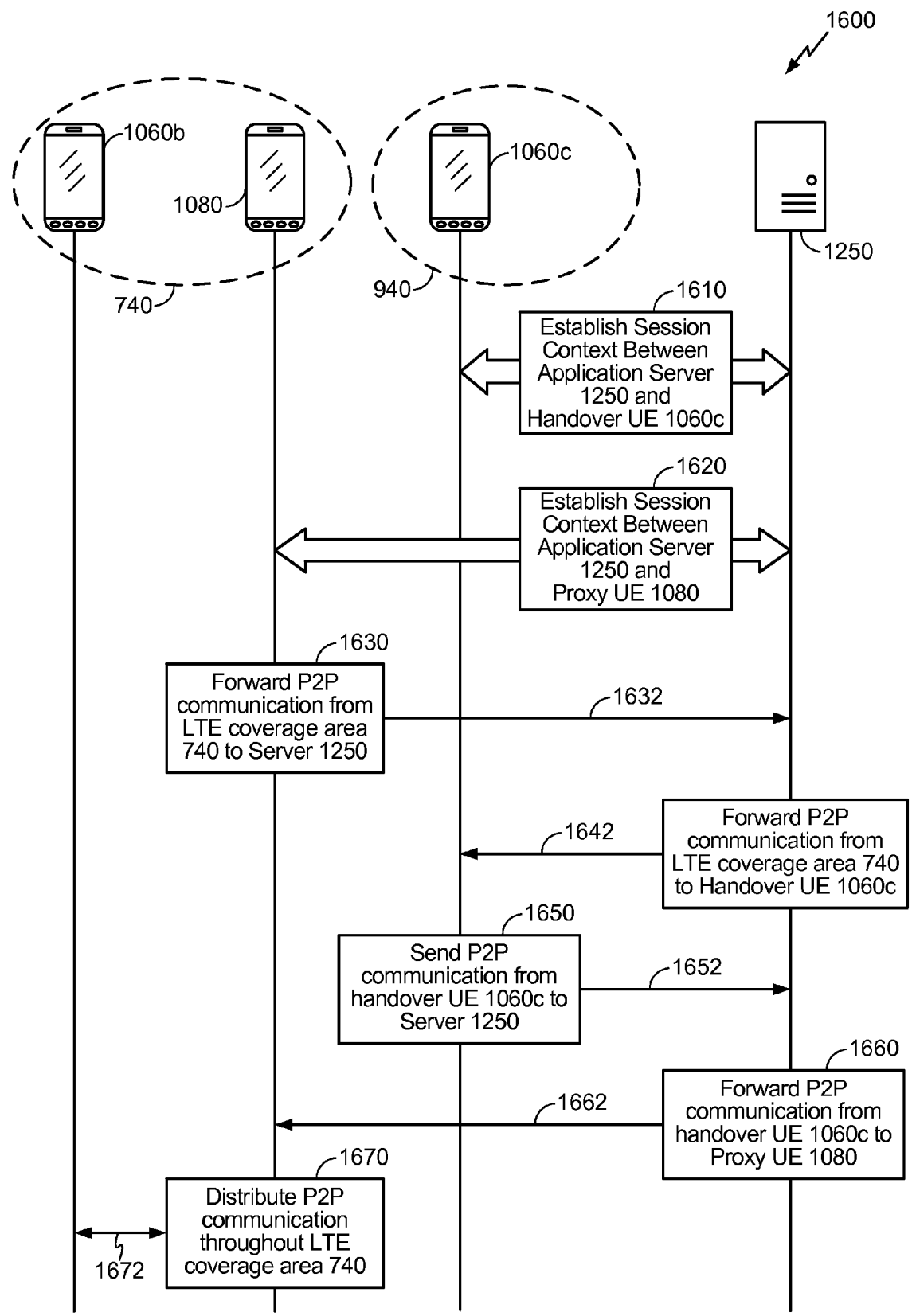
FIG. 16 illustrates a signaling flow diagram for direct data traffic routing according to an aspect of the disclosure.

FIG. 16 illustrates a signaling flow diagram 1600 for P2P group session communication routing according to an aspect of the disclosure. In the flow diagram 1600, a proxy UE and another UE (e.g., proxy UE 1080 and UE 1060*b* of FIG. 12, etc.) within an LTE-D group (e.g., LTE-D group 750. LTE-D group 850, etc.) are depicted within an LTE coverage area (e.g., LTE coverage area 740, LTE coverage area 840, etc.). A handover UE (e.g., handover UE 1060*c*, etc.) is depicted in a non-LTE coverage area (e.g., non-LTE coverage area 940). The signaling depicted in signaling flow diagram 1600 may occur after the handover UE 1060*c* has handed over to the non-LTE coverage area 940.

At 1610, session context is established between an application server (e.g., application server 1250, etc.) and the handover UE 1060*c*. At 1620, session context is established between an application server and the proxy UE 1080. Handover UE session context establishment 1610 and proxy UE session context establishment 1620 may occur in the order depicted in FIG. 16, simultaneously, or in the reverse of the order depicted in FIG. 16. In order to establish session context, the application server 1250 exchanges session context data with the handover UE 1060*c* and the proxy UE 1080. The session context data may comprise any data that enables D2D data traffic relay between the proxy UE 1080 and the handover UE 1060*c*, as shown at 1630, 1640, 1650, and 1660 of FIG. 16. For example, the session context data may include data that identifies the session ticket and the corresponding LTE-D group. The session context data may indicate one or more of the type of session (e.g., voice, non-voice), the users in the LTE-D group or group session, the session identifier associated with the session (e.g., a group URI), or a combination thereof.

At 1630, P2P group session communication 1632 from the LTE coverage area 740 is forwarded from the proxy UE 1080 to the application server 1250 in accordance with any suitable communications method. The P2P group session communication 1632 may originate at the proxy UE 1080, or it may be collected by the proxy UE 1080 from other UEs within the LTE coverage area 740, in particular, other UEs within the LTE-D group 750, for example, UE 1060*b*. In some scenarios, to generate the P2P group session communication 1632, the proxy UE 1080 combines multiple real-time media streams generated by multiple separate members of the LTE-D group 750. The P2P group session communication 1632 may be sent along the fourth link 1240, third link 1230, and second link 1220 depicted in FIG. 12. Alternatively, the P2P group session communication 1632 is sent along the uplink 880 and second link 1220 depicted in FIG. 13.

At 1640, P2P group session communication 1642 is forwarded from the application server 1250 to the handover UE 1060*c* in accordance with any suitable communications method. In one possible scenario, the P2P group session communication 1642 is sent along the first link 1210 depicted in FIG. 12 and FIG. 13. The P2P group session communication 1642 may consist of the P2P group session communication 1632. Additionally or alternatively, the P2P group session communication 1642 may comprise additional D2D data traffic. For example, if there is an additional handover UE similar to handover UE 1060c (that is, a UE that has exited the LTE coverage area 740 and entered either non-LTE coverage area 940 or a similar non-LTE coverage area), then the application server 1250 may form the P2P group session communication 1642 by combining the P2P group session communication 1632 received from the proxy UE proxy UE 1080 with the additional D2D data traffic from the additional handover UE. The handover UE 1060c would therefore remain in communication with not only the members of the LTE-D group 750 that remain in the LTE coverage area 740, but also other handover UEs that have exited the LTE coverage area 740. The application server 1250 may also serve as a buffer under certain circumstances, for example, if the handover UE 1060c has exited the LTE coverage area 740 but not yet connected to the application server 1250 via the non-LTE coverage area 940.

At 1650, P2P group session communication 1652 is sent from the handover UE 1060c to the application server 1250 in accordance with any suitable communications method. The P2P group session communication 1652 originates at the handover UE 1060c. In one possible scenario, the P2P group session communication 1652 is sent to the application server 1250 along the first link 1210 depicted in FIG. 12 and FIG. 13.

At 1660, P2P group session communication 1662 is forwarded from the application server 1250 to the proxy UE 1080 in accordance with any suitable communications method. In one possible scenario, the P2P group session communication 1662 is sent back to the proxy UE 1080 along the second link 1220, third link 1230, and fourth link 1240 depicted in FIG. 12. Alternatively, the P2P group session communication 1632 is sent back along the second link 1220 and uplink 880 depicted in FIG. 13. Once again, the P2P group session communication 1662 may consist solely of the P2P group session communication 1652 sent by the handover UE 1060c. Additionally or alternatively, the P2P group session communication 1662 may comprise additional D2D data traffic originating from similarly-situated handover UEs.

At 1670, the proxy UE 1080 distributes P2P group session communication 1672 among the members of the LTE-D group 750 that remain within the LTE coverage area 740, for example, UE 1060b, in accordance with any suitable communications method. In one possible scenario, the P2P group session communication 1672 is distributed along the D2D data traffic link 1070 depicted in FIG. 10 and FIG. 12. In another possible scenario, the P2P group session communication 1672 is distributed along the D2D data traffic link 880 and the D2D data traffic link 890 depicted in FIG. 13. The P2P group session communication 1672 may consist of the P2P group session communication 1662 received from the handover UE 1060c via the application server 1250. Additionally or alternatively, the P2P group session communication 1672 may comprise additional D2D data traffic originating at the proxy UE 1080 itself.

P2P group session communication 1672 may further include collection by the proxy UE 1080 of D2D data traffic originating with the members of the LTE-D group 750 that remain within the LTE coverage area 740, for example, UE 1060b. Once collected, the data can be forwarded to the handover UE 1060c as set forth above at 1630 and at 1640. The cycle may continue indefinitely.

At 1630, the forwarding of P2P group session communication 1632 may be responsive to any number of suitable triggers, for example, the generation by proxy UE 1080 of new data for P2P group session communication, or the receipt of such data from the members of the LTE-D group 750 that remain within the LTE coverage area 740, for example, UE 1060b. At 1650, the forwarding by handover UE 1060c of P2P group session communication 1632 may be responsive to analogous triggers. Application server 1250 may forward P2P group session communication 1642 or P2P group session communication 1662 in response to receipt of P2P group session communication 1632 or P2P group session communication 1652, respectively. Additionally or alternatively, the operations disclosed at 1630 through 1670 may occur intermittently, or according to a set schedule originating from proxy UE 1080, application server 1250, handover UE 1060c, or any combination thereof.

While the above-described embodiments are described with respect to LTE-D in part, it will be appreciated by one of ordinary skill in the art that the above-described embodiments can be implemented with respect to any D2D P2P technology or interface (e.g., LTE-D, WFD, Bluetooth, near field communication (NFC), etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for a user equipment (UE) in a peer-to-peer group (P2P group) to maintain continuity of a P2P group session, comprising:
   exchanging a first P2P group session communication with a member of the P2P group via a direct data traffic connection;
   requesting session data from an application server;
   conveying the session data to a proxy UE, wherein the proxy UE is a member of the P2P group; and
   exchanging a second P2P group session communication with the application server in accordance with the session data.

2. The method of claim 1, wherein:
   the session data conveyed to the proxy UE comprises data which enables the proxy UE to exchange the second P2P group session communication with the application server.

3. The method of claim 1, wherein:
   the UE is a mobile device; and
   the direct data traffic connection is a device-to-device (D2D) data traffic connection for direct communication between mobile devices.

4. The method of claim 1, wherein:
   the UE is a multimode UE; and
   requesting session data from the application server is responsive to a determination by a system selection procedure that an inter-system handover is imminent.

5. The method of claim 4, wherein:
   the P2P group session is a long term evolution direct (LTE-D) group session; and
   the inter-system handover is a handover from a long term evolution (LTE) radio access area to a non-LTE radio access area.

6. The method of claim 4, wherein the method further comprises:
   determining that the inter-system handover is complete, wherein exchanging the second P2P group session communication with the application server is responsive to the determination that an inter-system handover is complete.

7. The method of claim 1, wherein the UE is a single mode UE, and the session data request is responsive to at least one of: (i) discovering the P2P group session, (ii) joining the P2P group session, (iii) exchanging the P2P group session communication, (iv) identifying the proxy UE, (v) selecting the proxy UE, (vi) communicating with the proxy UE, or (vii) a combination thereof.

8. The method of claim 7, further comprising:
   determining that an inter-system handover has occurred, wherein the second P2P group session communication is exchanged with the application server in response to the determination that the inter-system handover has occurred.

9. The method of claim 1, wherein the UE is configured to connect to a plurality of radio access networks.

10. The method of claim 1, further comprising selecting the proxy UE, wherein the proxy UE is selected in accordance with a proxy UE selection process comprising:
    discovering the P2P group;
    exchanging capability data with at least one member of the P2P group, wherein the capability data relates to suitability for serving as the proxy UE for the P2P group; and
    selecting the proxy UE for the P2P group on the basis of the exchanged capability data.

11. The method of claim 10, wherein exchanging capability data comprises:
    collecting first capability data based on at least one characteristic of the UE;
    transmitting the first capability data to the at least one member of the P2P group; and
    receiving second capability data from the at least one member of the P2P group.

12. The method of claim 11, wherein the at least one characteristic comprises at least one of wireless local area network (WLAN) access, battery life, or available processing power, and a high level of the at least one characteristic is associated with greater suitability to serve as the proxy UE.

13. The method of claim 10, wherein selecting a proxy UE comprises:
   ranking the UE and the at least one member of the P2P group on the basis of the exchanged capability data; and
   selecting the proxy UE on the basis of the rankings.

14. The method of claim 10, wherein the proxy UE selection method is initiated responsive to a determination that at least one of the following has occurred: (i) the P2P group session has been discovered; (ii) a previous proxy UE has left the P2P group; (iii) a new member has joined the P2P group; (iv) a duration of time has elapsed since the last proxy UE selection has been made, or (v) a combination thereof.

15. A user equipment (UE) that maintains continuity of a peer-to-peer group (P2P group) session, comprising:
   a processor to:
      exchange a first P2P group session communication with a member of the P2P group via a direct data traffic connection;
      request session data from an application server;
      convey the session data to a proxy UE, wherein the proxy UE is a member of the P2P group; and
      exchange a second P2P group session communication with the application server in accordance with the session data; and
   a memory, coupled to the processor, to store related data and instructions.

16. The UE of claim 15, wherein:
   the session data comprises data which enables the proxy UE to exchange the second P2P group session communication with the application server.

17. The UE of claim 15, wherein:
   the UE is a mobile device; and
   the direct data traffic connection is a device-to-device (D2D) data traffic connection for direct communication between mobile devices.

18. The UE of claim 15, wherein:
   the UE is a multimode UE; and
   the processor requests session data from the application server in response to a determination by a system selection procedure that an inter-system handover is imminent.

19. The UE of claim 18, wherein:
   the P2P group session is a long term evolution direct (LTE-D) group session; and
   the inter-system handover is a handover from a long term evolution (LTE) radio access area to a non-LTE radio access area.

20. The UE of claim 18, wherein the method further comprises:
   determining that the inter-system handover is complete, wherein the processor exchanges the second P2P group session communication with the application server in response to the determination that an inter-system handover is complete.

21. The UE of claim 15, wherein the UE is a single mode UE, and the processor requests the session data in response to at least one of: (i) discovering the P2P group session, (ii) joining the P2P group session, (iii) exchanging the P2P group session communication, (iv) identifying the proxy UE, (v) selecting the proxy UE, (vi) communicating with the proxy UE, or (vii) a combination thereof.

22. The UE of claim 21, wherein:
   the processor determines that an inter-system handover has occurred; and
   the processor exchanges the second P2P group session communication with the application server in response to the determination that the inter-system handover has occurred.

23. The UE of claim 15, wherein the UE is configured to connect to a plurality of radio access networks.

24. The UE of claim 15, wherein, to select the proxy UE, the processor:
   discovers the P2P group;
   exchanges capability data with at least one member of the P2P group, wherein the capability data relates to suitability for serving as the proxy UE for the P2P group; and
   selects the proxy UE for the P2P group on the basis of the exchanged capability data.

25. The UE of claim 24, wherein, to exchange capability data, the processor:
   collects first capability data based on at least one characteristic of the UE;
   transmits the first capability data to the at least one member of the P2P group; and
   receives second capability data from the at least one member of the P2P group.

26. The UE of claim 25, wherein the at least one characteristic comprises at least one of wireless local area network (WLAN) access, battery life, or available processing power, and a high level of the at least one characteristic is associated with greater suitability to serve as the proxy UE.

27. The UE of claim 24, wherein, to select the proxy UE, the processor further:
   ranks the UE and the at least one member of the P2P group on the basis of the exchanged capability data; and
   selects the proxy UE on the basis of the rankings.

28. The UE of claim 24, wherein the processor selects the proxy UE in response to a determination that at least one of the following has occurred: (i) the P2P group session has been discovered; (ii) a previous proxy UE has left the P2P group; (iii) a new member has joined the P2P group; (iv) a duration of time has elapsed since the last proxy UE selection has been made, or (v) a combination thereof.

29. A non-transitory computer-readable medium comprising code, which, when executed by a processor, causes the processor to perform operations for maintaining continuity of a peer-to-peer group (P2P group) session, the non-transitory computer-readable medium comprising:
   code for exchanging a first P2P group session communication with a member of the P2P group via a direct data traffic connection;
   code for requesting session data from an application server;
   code for conveying the session data to a proxy UE, wherein the proxy UE is a member of the P2P group; and
   code for exchanging a second P2P group session communication with the application server in accordance with the session data.

30. An apparatus for maintaining continuity of a peer-to-peer group (P2P group) session, comprising:
   means for exchanging a first P2P group session communication with a member of the P2P group via a direct data traffic connection;
   means for requesting session data from an application server;

means for conveying the session data to a proxy UE, wherein the proxy UE is a member of the P2P group; and means for exchanging a second P2P group session communication with the application server in accordance with the session data.

\* \* \* \* \*